(12) United States Patent
Gomi et al.

(10) Patent No.: US 11,450,184 B2
(45) Date of Patent: Sep. 20, 2022

(54) PSEUDO FORCE SENSE GENERATION APPARATUS

(71) Applicant: NIPPON TELEGRAPH AND TELEPHONE CORPORATION, Tokyo (JP)

(72) Inventors: Hiroaki Gomi, Tokyo (JP); Ryoma Tanase, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/257,259

(22) PCT Filed: Jul. 1, 2019

(86) PCT No.: PCT/JP2019/026025
§ 371 (c)(1),
(2) Date: Dec. 30, 2020

(87) PCT Pub. No.: WO2020/009050
PCT Pub. Date: Jan. 9, 2020

(65) Prior Publication Data
US 2021/0280024 A1  Sep. 9, 2021

(30) Foreign Application Priority Data

Jul. 4, 2018  (JP) .............................. JP2018-127674

(51) Int. Cl.
*G08B 6/00* (2006.01)
*G01S 13/08* (2006.01)

(52) U.S. Cl.
CPC ................ *G08B 6/00* (2013.01); *G01S 13/08* (2013.01)

(58) Field of Classification Search
CPC . G08B 6/00; G01S 13/08; G01S 13/88; G06F 3/01
See application file for complete search history.

(56) References Cited

U.S. PATENT DOCUMENTS

2014/0022064 A1* 1/2014 Ito ........................... G06F 3/016
340/407.2
2019/0087063 A1  3/2019 Gomi et al.

FOREIGN PATENT DOCUMENTS

| JP | H1159355 | A | 3/1999 |
| JP | 201421703 | A | 2/2014 |
| JP | 2015226388 | A | 12/2015 |
| JP | 6126047 | B2 | 4/2017 |
| JP | 201884920 | A | 5/2018 |
| WO | 2017183537 | A | 10/2017 |
| WO | 2019123622 | A1 | 6/2019 |

OTHER PUBLICATIONS

Amemiya et al. (2014) ""Burunabi 3" A Device that Produces a Feeling of Being Pulled when Pinched with the Fingers" NTT Technical Journal, vol. 26, No. 9, pp. 23-26.

* cited by examiner

*Primary Examiner* — Omeed Alizada

(57) ABSTRACT

A simulated force sensation based on an external object is presented without making contact with that external object. Asymmetrical movement based on a first physical quantity or a function value of the first physical quantity is carried out, and a simulated force sensation based on the asymmetrical movement is presented, the first physical quantity having been obtained by measuring a distance from an external object to a simulated force sensation presenting apparatus.

17 Claims, 20 Drawing Sheets

A

B

A

B

A

B

A

B

PSEUDO FORCE SENSE GENERATION APPARATUS

CROSS-REFERENCE TO RELATED APPLICATIONS

This application is a U.S. 371 Application of International Patent Application No. PCT/JP2019/026025, filed on 1 Jul. 2019, which application claims priority to and the benefit of JP Application No. 2018-127674, filed on 4 Jul. 2018, the disclosures of which are hereby incorporated herein by reference in their entireties.

TECHNICAL FIELD

The present invention relates to a technique for presenting a simulated force sensation.

BACKGROUND ART

A visually-impaired person often avoids obstacles and so on by touching objects in the outside world (called "external objects" hereinafter) using a cane or his/her own hand to discover the presence, positions, shapes, and so on of the external objects. However, touching in such a way is not appropriate for fragile objects, objects which are not to be touched, when confirming the positions of other people while walking or riding in a vehicle, and so on. Furthermore, it is only possible to touch objects within range of the person's hand or cane.

Techniques have been proposed in which information such as the distance to or shape of an external object is measured in a non-contact manner, and information such as sound or vibrations is then presented in accordance with a result of the measurement (see PTL 1, for example). However, with such techniques, it is difficult to present a simulated force sensation in accordance with the result of the measurement.

Techniques have also been proposed in which an actuator is controlled on the basis of a control signal to cause a simulated force sensation to be felt (see PTL 2 and 3, and NPL 1, for example). Using such a technique makes it possible to present a simulated force sensation can in a desired direction.

CITATION LIST

Patent Literature

[PTL 1]: Japanese Patent Application Publication No. H11-59355
[PTL 2]: Japanese Patent No. 6126047
[PTL 3]: WO 2017/183537

Non Patent Literature

[NPL 1]: Amemiya, T., Takamuku, S., Itoh, S., and Gomi, H. "Yubi de Tsumamu to Hippparareru Kankaku wo Umidasu Souchi 'Burunabi 3'(Burunavi 3, a Device Creating a Pulled Sensation when Pinched with the Fingers.)" *NTT Technical Journal*, 2014, Vol. 26, No. 9, pp. 23-26.

SUMMARY OF THE INVENTION

Technical Problem

However, no techniques are known for presenting a simulated force sensation based on an external object without making contact with that external object.

With the foregoing in view, it is an object of the present invention to provide a technique for presenting a simulated force sensation based on an external object without making contact with that external object.

Means for Solving the Problem

To solve the above-described problem, a simulated force sensation presenting apparatus is provided, the apparatus including a force sensation presenting mechanism that carries out asymmetrical movement based on a first physical quantity or a function value of the first physical quantity and presents a simulated force sensation based on the asymmetrical movement, the first physical quantity having been obtained by measuring a distance from an external object to the simulated force sensation presenting apparatus.

Effects of the Invention

Through the foregoing, a simulated force sensation based on an external object can be presented without making contact with that external object.

DESCRIPTION OF EMBODIMENTS

Embodiments of the present invention will be described hereinafter with reference to the drawings.

First Embodiment

Figure 1:
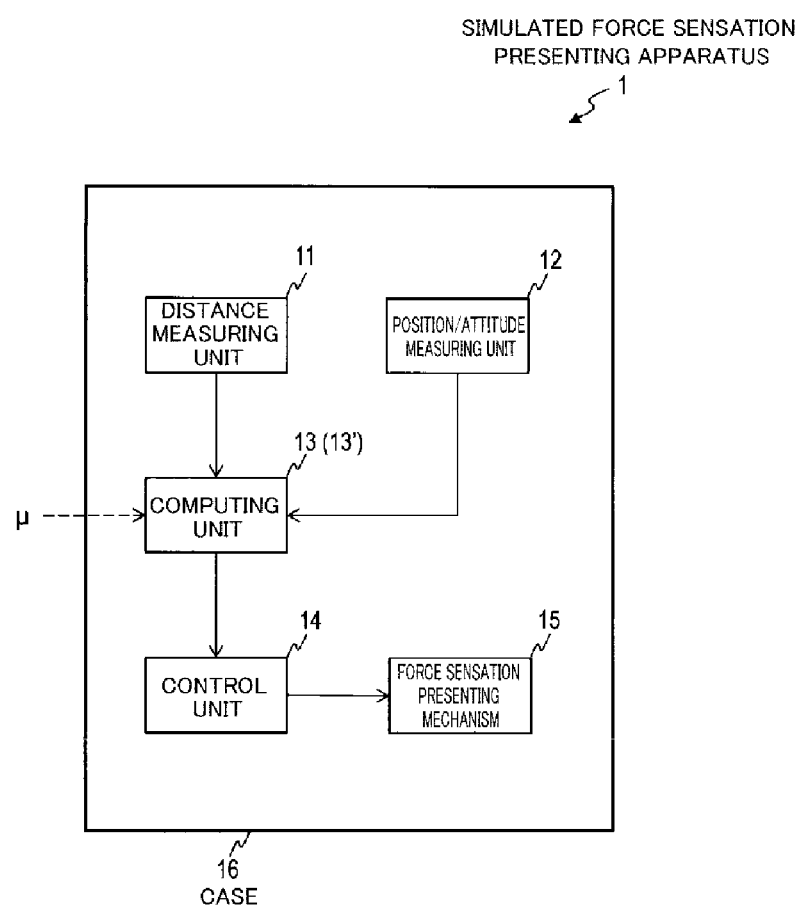
FIG. 1 is a block diagram illustrating an example of a simulated force sensation presenting apparatus according to an embodiment.

First, a first embodiment will be described.
<Configuration>
As illustrated in FIG. 1, a simulated force sensation presenting apparatus 1 according to the present embodiment includes a distance measuring unit 11, a position/attitude measuring unit 12, a computing unit 13, a control unit 14, a force sensation presenting mechanism 15, and a case 16.

The distance measuring unit 11 is a known sensor that measures a distance from the simulated force sensation presenting apparatus 1 to an external object in a non-contact manner. For example, a sensor that measures a distance using a laser beam, infrared light, ultrasonic waves, millimeter waves, or the like can be used as the distance measuring unit 11. The position/attitude measuring unit 12 is a sensor that measures at least one of movement and an attitude of the simulated force sensation presenting apparatus 1. For example, the position/attitude measuring unit 12 is a GPS sensor, a magnetism sensor, an accelerometer (e.g., a three-axis translational accelerometer), a gyrosensor (e.g., a three-axis gyrosensor), or the like that measures a position, a speed, an acceleration, an orientation, an angular velocity, an angular acceleration, or the like. The computing unit 13 and the control unit 14 are devices realized by, for example, a generic or specialized computer including a processor (a hardware processor) such as a CPU (central processing unit), memory such as RAM (random-access memory) and ROM (read-only memory), and the like executing a predetermined program. This computer may include a single processor and memory, or a plurality of processors and memories. The program may be installed in the computer, or may be recorded in ROM or the like in advance. Some or all of the processing units may be constituted by electronic circuitry which implements processing functions without using programs, instead of electronic circuitry that implements the functional configuration by having programs loaded, such as a CPU. Additionally, the electronic circuitry constituting a single apparatus may include a plurality of CPUs.

Figure 2:
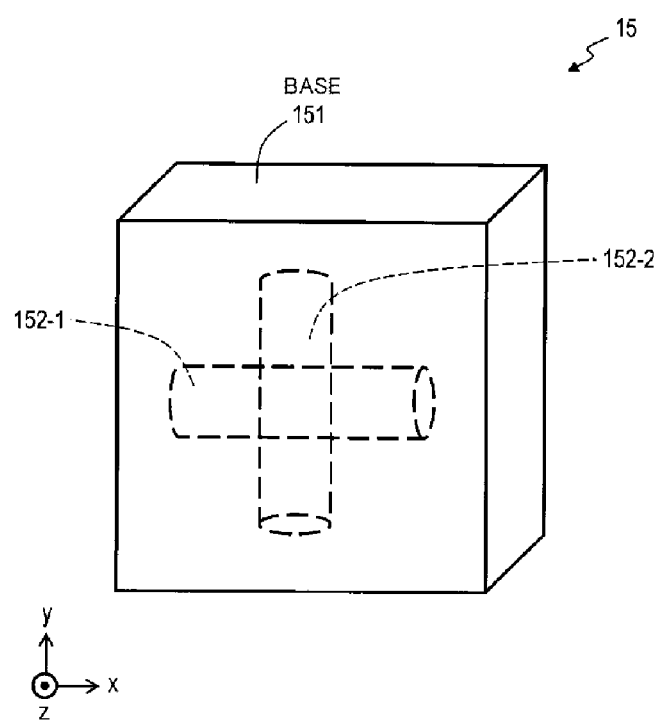
FIG. 2 is a conceptual diagram illustrating an example of a force sensation presenting mechanism illustrated in FIG. 1.

As illustrated in FIG. 2, the force sensation presenting mechanism 15 according to the present embodiment includes: a base 151; an asymmetrical movement unit 152-1 that is attached to the base 151 and presents a simulated force sensation in an x-axis direction (i.e., a force sensation in a translational direction); and an asymmetrical movement unit 152-2 that is attached to the base 151 and presents a simulated force sensation in a y-axis direction (i.e., a force sensation in a translational direction). The x-axis and the y-axis are axes of an orthogonal coordinate system fixed to the base 151 (an orthogonal coordinate system constituted by an x-axis, a y-axis, and a z-axis). In the present embodiment, the asymmetrical movement units 152-1 and 152-2 are disposed overlapping each other so as to form a cross shape. By controlling the driving of the asymmetrical movement units 152-1 and 152-2, a simulated force sensation can be presented in a desired direction in an x-y plane. The asymmetrical movement units 152-1 and 152-2 are devices which present a simulated force sensation on the basis of asymmetrical movement (cyclical asymmetrical movement, e.g., asymmetrical vibration). Note that asymmetrical acceleration movement, asymmetrical speed movement, asymmetrical amplitude movement, and the like are examples of asymmetrical movement. "Simulated force sensation" refers to a perception of feeling a force being continuously exerted in a specific direction by an object, despite no force actually being applied continuously in that specific direction. For example, PTL 2 and 3, NPL 1, and the like describe examples of the asymmetrical movement units 152-1 and 152-2. Additionally, that a simulated force sensation in a desired direction can be presented by a combination of the asymmetrical movement units 152-1 and 152-2 is also disclosed in, for example, Reference Document 1 (Japanese Patent Application Publication No. 2015-225520), Reference Document 2 (Japanese Patent Application Publication No. 2017-208905), and so on.

The case 16 is a hollow member. The case 16 is formed from synthetic resin, metal, glass, wood, rubber, or the like, for example. The distance measuring unit 11, the position/attitude measuring unit 12, the computing unit 13, the control unit 14, and the base 151 of the force sensation presenting mechanism 15 are fixed within the case 16.

<<Example of Configuration of Asymmetrical Movement Unit 152-$i$ (where $i$ is 1 or 2)>>

Figure 3:
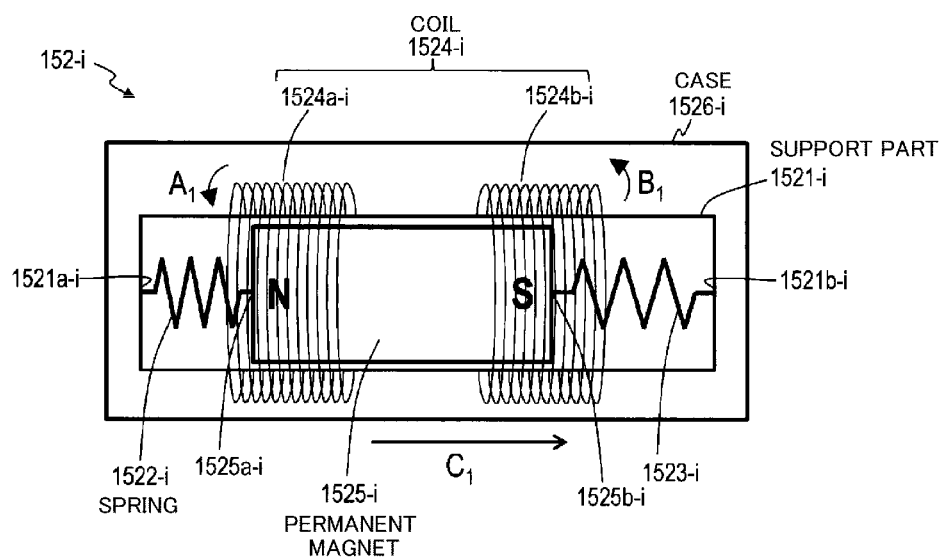
FIG. 3A and FIG. 3B are conceptual diagrams illustrating asymmetrical movement units illustrated in FIG. 2.
Figure 3:
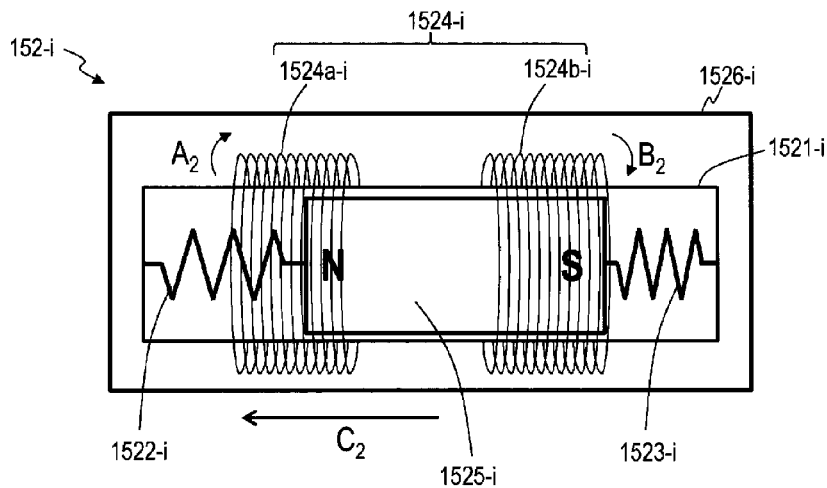

As illustrated in FIG. 3A and FIG. 3B, the asymmetrical movement unit 152-$i$ (vibrator; actuator) includes, for example, a support part 1521-$i$, springs 1522-$i$ and 1523-$i$, a coil 1524-$i$, a permanent magnet 1525-$i$, and a case 1526-$i$. The case 1526-$i$ and the support part 1521-$i$ are both hollow members, cylindrical in shape, with both open ends thereof closed off. However, the support part 1521-$i$ is smaller than the case 1526-$i$, and is a size that allows the support part 1521-$i$ to be contained within the case 1526-$i$. The case 1526-$i$ and the support part 1521-$i$ are formed from a synthetic resin such as ABS resin, for example. The springs 1522-$i$ and 1523-$i$ are coil springs, plate springs, or the like formed from metal or the like, for example. It is desirable that the springs 1522-$i$ and 1523-$i$ have the same spring constant, the spring constants may be different. The permanent magnet 1525-$i$ is, for example, a pillar-shaped permanent magnet, with one end 1525$a$-$i$ thereof in the lengthwise direction being an N pole and the other end 1525$b$-$i$ being an S pole. The coil 1524-$i$ is, for example, a single piece of enameled wire, and includes a first winding part 1524$a$-$i$ and a second winding part 1524$b$-$i$.

The permanent magnet 1525-$i$ is contained within the support part 1521-$i$, and is supported therein so as to be capable of sliding in the lengthwise direction. Although the mechanism for this support is not illustrated in detail, for example, a straight rail is provided on an inner wall surface of the support part 1521-$i$, extending in the lengthwise direction, and a rail support part is provided on a side surface of the permanent magnet 1525-*i*, the rail support part supporting the permanent magnet 1525-*i* so as to be capable of sliding along the rail. One end of the spring 1522-*i* is fixed to an inner wall surface 1521*a*-*i* on one end of the support part 1521-*i* in the lengthwise direction thereof, and the other end of the spring 1522-*i* is fixed to the end 1525*a*-*i* of the permanent magnet 1525-*i*. Additionally, one end of the spring 1523-*i* is fixed to an inner wall surface 1521*b*-*i* on the other end of the support part 1521-*i* in the lengthwise direction thereof, and the other end of the spring 1523-*i* is fixed to the end 1525*b*-*i* of the permanent magnet 1525-*i*.

The coil 1524-*i* is wound around the outer circumferential side of the support part 1521-*i*. However, on the end 1525*a*-*i* side (the N pole side) of the permanent magnet 1525-*i*, the first winding part 1524*a*-*i* is wound in an $A_1$ direction (from the far side toward the near side), whereas on the end 1525*b*-*i* side (the S pole side), the second winding part 1524*b*-*i* is wound in a $B_1$ direction opposite from the $A_1$ direction (i.e., from the near side toward the far side). In other words, when viewed from the end 1525*a*-*i* side (the N pole side) of the permanent magnet 1525-*i*, the first winding part 1524*a*-*i* is wound in the clockwise direction, and the second winding part 1524*b*-*i* is wound in the counterclockwise direction. Furthermore, it is desirable that when the permanent magnet 1525-*i* is stopped and the elastic force from the springs 1522-*i* and 1523-*i* is balanced, the end 1525*a*-*i* side (the N pole side) of the permanent magnet 1525-*i* be located in a region corresponding to the first winding part 1524*a*-*i*, and the end 1525*b*-*i* side (the S pole side) be located in a region corresponding to the second winding part 1524*b*-*i*.

The support part 1521-*i*, the springs 1522-*i* and 1523-*i*, the coil 1524-*i*, and the permanent magnet 1525-*i* configured and arranged as described above are contained within the case 1526-*i*, and the support part 1521-*i* is fixed to an inner part of the case 1526-*i*. Note that the lengthwise direction of the case 1526-*i* is the same as the lengthwise direction of the support part 1521-*i* and the lengthwise direction of the permanent magnet 1525-*i*.

When current is passed through the coil 1524-*i* in the $A_1$ direction (the $B_1$ direction), Lorentz force counteraction, as described by Fleming's left-hand rule, causes a force to be exerted on the permanent magnet 1525-*i* in a $C_1$ direction (a direction from the N pole toward the S pole of the permanent magnet 1525-*i*; rightward) (FIG. 3A). Conversely, when current is passed through the coil 1524-*i* in an $A_2$ direction (a $B_2$ direction), a force is exerted on the permanent magnet 1525-*i* in a $C_2$ direction (a direction from the S pole toward the N pole of the permanent magnet 1525-*i*; leftward) (FIG. 3B). Note that the $A_2$ direction is opposite from the $A_1$ direction. As a result of these actions, kinetic energy is imparted on the system constituted by the permanent magnet 1525-*i* and the springs 1522-*i* and 1523-*i*. This makes it possible to change the position and acceleration of the permanent magnet 1525-*i* relative to the case 1526-*i*.

Here, a period (time) for which the current is passed through the coil 1524-*i* in a predetermined direction, and a period aside from the stated period, are repeated in a cyclical manner. At this time, by shifting the ratio of the period for which the current is passed through the coil in the predetermined direction to the period aside from that period (an inversion ratio) so that one of the periods is longer, an operator can cause the permanent magnet 1525-*i* to produce asymmetrical movement (asymmetrical vibration), making it possible to present simulated force sensation in a desired direction. The current may have any type of waveform as long as the period for which the current is passed in the predetermined direction and the period aside from that period are repeated in a cyclical manner, and the inversion ratio is shifted so that one of the periods is longer. The simulated force sensation presenting device according to the present invention can present a simulated force sensation in the left direction or the right direction indicated in FIG. 3A and FIG. 3B in accordance with, for example, a ratio between a period $t_1$ in which current is passed in the $A_1$ direction (the $B_1$ direction) and a period $t_2$ in which current is passed in the $A_2$ direction (the $B_2$ direction) (an inversion ratio $t_1$:$t_2$). When a simulated force sensation is presented in the left direction indicated in FIG. 3A and FIG. 3B, a cyclical current having an inversion ratio in which $t_1 > t_2$ is passed through the coil 1524-*i*. Conversely, when a simulated force sensation is presented in the right direction, a cyclical current having an inversion ratio in which $t_1 < t_2$ is passed through the coil 1524-*i*. Note that the direction of the simulated force sensation is a direction of a force sensation which can be perceived by a human. The direction of the simulated force sensation is specified by a function value for the period for which the current is passed through the coil in the predetermined direction and a period aside from that period. Additionally, by controlling the driving frequency, the inversion ratio, and the peak value of a drive signal (e.g., the driving current passed through the coil 1524-*i* or a driving voltage applied to the coil 1524-*i*), the operator can control the magnitude of the simulated force sensation which is presented. For example, the simulated force sensation becomes stronger with a driving frequency in which the frequency of cyclical acceleration movement is closer to 80 Hz, whereas the simulated force sensation becomes weaker with a driving frequency in which the frequency of cyclical acceleration movement is further from 80 Hz (see PTL 2, for example). Additionally, when a simulated force sensation is presented in the left direction in FIG. 3A and FIG. 3B, the simulated force sensation can be made stronger as the ratio of the period $t_2$ to the period $t_1$ decreases. When a simulated force sensation is presented in the right direction in FIG. 3A and FIG. 3B, the simulated force sensation can be made stronger as the ratio of the period $t_1$ to the period $t_2$ decreases. Furthermore, when a simulated force sensation is presented in the left direction in FIG. 3A and FIG. 3B, the simulated force sensation can be made stronger as the peak of the current flowing in the $A_2$ direction (the $B_2$ direction) increases. When a simulated force sensation is presented in the right direction in FIG. 3A and FIG. 3B, the simulated force sensation can be made stronger as the peak of the current flowing in the $A_1$ direction (the $B_1$ direction) increases. In other words, the simulated force sensation can be made stronger as the amplitude of the permanent magnet 1525-*i* increases. Note that the magnitude of the simulated force sensation is a magnitude of a force sensation which can be perceived by a human. The magnitude of the simulated force sensation can be expressed using a function value that takes at least one of the driving frequency, the inversion ratio, and the peak value as an argument (e.g., a proportional function, an Nth-order proportional function, an exponential proportional function, a sigmoid function, or the like). Note, however, that the magnitude of a force sensation perceived by a human is not necessarily proportional to the driving frequency, the inversion ratio, the peak value, the amplitude of the permanent magnet 1525-*i*, or the like, and thus an optimal function is selected so that the magnitude of the simulated force sensation is presented appropriately. Furthermore, the magnitude of a simulated force sensation which can be presented appropriately is limited by the mechanical structure of the asymmetrical movement unit 152-*i*, and thus a threshold may be provided for the input values of such functions, with input values not conforming to the threshold being fixed to that threshold.

<Operations>

Operations of the simulated force sensation presenting apparatus 1 according to the first embodiment will be described next.

Figure 4:
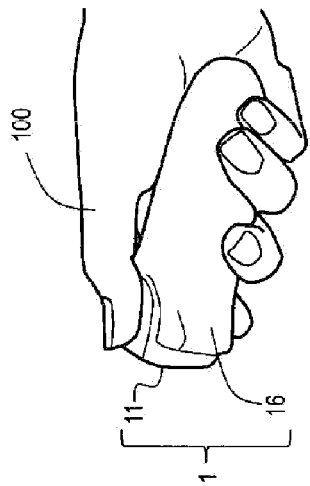
FIG. 4A and FIG. 4B are conceptual diagrams illustrating an example of a usage state of the simulated force sensation presenting apparatus according to the embodiment.
Figure 4:
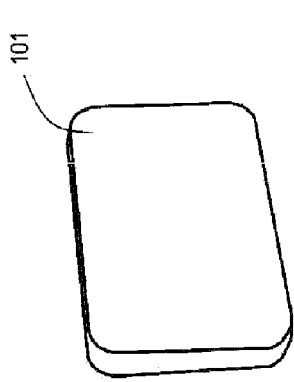
Figure 4:
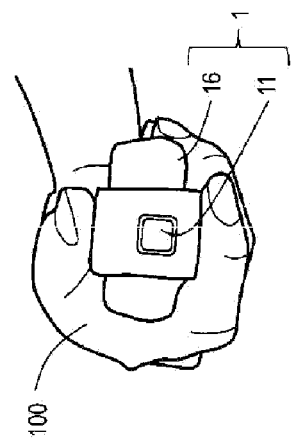

As illustrated in FIG. 4A and FIG. 4B, a user 100 grips the case 16 of the simulated force sensation presenting apparatus 1 from the outside. The distance measuring unit 11 measures a distance, in the y-axis direction, from the simulated force sensation presenting apparatus 1 to an external object 101 (e.g., a wall, a floor, an installed object, an obstacle, a human, or the like), obtains a physical quantity P1 expressing a result of the measurement (e.g., a measured distance) (a first physical quantity), and outputs that physical quantity to the computing unit 13 (13'). The position/attitude measuring unit 12 measures at least one of movement and an attitude of the simulated force sensation presenting apparatus 1 itself, obtains at least one of a physical quantity P2 expressing that movement (e.g., a position, a speed, an acceleration, or the like) (a second physical quantity) and a physical quantity P3 expressing the attitude (e.g., an orientation, an angular velocity, an angular acceleration, or the like) (a third physical quantity), and outputs that physical quantity to the computing unit 13 (13').

The physical quantity P1 obtained by the distance measuring unit 11, and at least one of the physical quantity P2 and the physical quantity P3 obtained by the position/attitude measuring unit 12, are input to the computing unit 13. Using the input physical quantities, the computing unit 13 obtains a control signal CS and outputs that control signal CS to the control unit 14. Here, the control signal CS is a control signal required in order to enable the force sensation presenting mechanism 15 to present a simulated force sensation on the basis of asymmetrical movement as a result of the asymmetrical movement unit 152-*i* included in the force sensation presenting mechanism 15 carrying out the asymmetrical movement based on at least one of the physical quantities and function values of the physical quantities.

The control unit 14 generates a drive signal DS (a driving current or a driving voltage) corresponding to the control signal CS obtained by the computing unit 13, and supplies the drive signal DS to the coil 1524-*i* of the asymmetrical movement unit 152-*i*. Through this, the asymmetrical movement unit 152-*i* carries out asymmetrical movement based on at least one of the physical quantity P1 (the first physical quantity obtained by measuring the distance from the external object to the simulated force sensation presenting apparatus 1), the function value of the physical quantity P1, the physical quantity P2 (the second physical quantity obtained by measuring movement of the simulated force sensation presenting apparatus 1), the function value of the physical quantity P2, the physical quantity P3 (the third physical quantity obtained by measuring the attitude of the simulated force sensation presenting apparatus 1), and the function value of the physical quantity P3; as a result, the force sensation presenting mechanism 15 presents a simulated force sensation based on the asymmetrical movement to the user. The user 100 gripping the simulated force sensation presenting apparatus 1 to which the force sensation presenting mechanism 15 is attached then perceives the simulated force sensation based on at least one of the physical quantity P1, the function value of the physical quantity P1, the physical quantity P2, the function value of the physical quantity P2, the physical quantity P3, and the function value of the physical quantity P3. Specific examples will be given hereinafter.

Specific Example 1-1

Specific Example 1-1 is an example in which the asymmetrical movement units included in the force sensation presenting mechanism 15 carry out asymmetrical movement based on the physical quantity P1 (the physical quantity P1 obtained by measuring the y-direction distance from the external object 101 to the simulated force sensation presenting apparatus 1) and, as a result, the force sensation presenting mechanism 15 presents a simulated force sensation based on that asymmetrical movement (a simulated force sensation based on the physical quantity P1). In this example, the distance measuring unit 11 measures as distance L, in the y-axis direction, from the simulated force sensation presenting apparatus 1 to the external object 101 (FIG. 5A and FIG. 5B), and a physical quantity P1 of L, expressing the result of this measurement, is input to the computing unit 13. The computing unit 13 then generates and outputs the control signal CS for causing the user to perceive a simulated force sensation $F_{yp}$, indicated as follows.

$$F_{yp} = k_{yp}(L - L_e) \text{ for } 0 \leq L < L_{max} \quad (1)$$

$$F_{yp} = F_{yp}^{max} \text{ for } L \geq L_{max} \quad (2)$$

Here, $k_{yp}$ is a positive gain constant. $L_e$ is a predetermined positive reference distance. The orientation of the simulated force sensation $F_{yp}$ is the y-axis direction. A simulated force sensation $F_{yp}$ in the direction from the simulated force sensation presenting apparatus 1 toward the external object 101 is expressed by a positive value, whereas a simulated force sensation $F_{yp}$ in the direction from the external object 101 toward the simulated force sensation presenting apparatus 1 is expressed by a negative value. $F_{yp}^{max}$ indicates a maximum value of $F_{yp}$. As described above, the orientation and magnitude of the simulated force sensation can be controlled by the function value, which takes the driving frequency, the inversion ratio, the peak value, or the like of the drive signal DS as an argument (see PTL 2 and 3, for example); as such, the drive signal DS corresponding to a desired simulated force sensation $F_{yp}$ can be specified, and the control signal CS corresponding to that drive signal DS can also be calculated. For example, a simulation which uses the desired simulated force sensation $F_{yp}$ as a target value may be carried out, and the control signal CS may be set so that that simulated force sensation $F_{yp}$ is presented. When the drive signal DS corresponding to such a control signal CS is supplied to the force sensation presenting mechanism 15, the user 100 perceives a simulated force sensation in the manner described below. When the distance L from the external object 101 to the simulated force sensation presenting apparatus 1 has dropped below a reference distance $L_e$, the user 100 perceives a simulated force sensation of pushing away from the external object 101 with a force that is greater as the distance L between the simulated force sensation presenting apparatus 1 and the external object 101 decreases. On the other hand, when the distance L from the external object 101 to the simulated force sensation presenting apparatus 1 exceeds the reference distance $L_e$, the user 100 perceives a simulated force sensation of pulling back toward the external object 101 at the maximum force $F_{yp}^{max}$ of the simulated force sensation presenting apparatus 1. Accordingly, the user 100 is guided to a place where the simulated force sensation presenting apparatus 1 which he or she grips is located in a position from the external object 101 by the reference distance $L_e$.

Specific Example 1-2

Specific Example 1-2 is also an example in which the asymmetrical movement units included in the force sensation presenting mechanism 15 carry out asymmetrical movement based on the physical quantity P1 being L and, as a result, the force sensation presenting mechanism 15 presents a simulated force sensation based on that asymmetrical movement. The physical quantity P1 of L is input to the computing unit 13 in this example as well. The computing unit 13 then generates and outputs the control signal CS for causing the user to perceive the simulated force sensation $F_{yp}$, indicated as follows.

$$F_{yp} = k_{YP}(L-L_e) \text{ for } 0 \le L < L_e \quad (3)$$

$$F_{yp} = 0 \text{ for } L \ge L_e \quad (4)$$

When the drive signal DS corresponding to such a control signal CS is supplied to the force sensation presenting mechanism 15, the user 100 perceives a simulated force sensation in the manner described below. When the distance L from the external object 101 to the simulated force sensation presenting apparatus 1 has dropped below a reference distance $L_e$, the user 100 perceives a simulated force sensation of pushing away from the external object 101 with a force that is greater as the distance L from the simulated force sensation presenting apparatus 1 to the external object 101 decreases. On the other hand, when the distance L from the external object 101 to the simulated force sensation presenting apparatus 1 exceeds the reference distance $L_e$, the user 100 does not perceive a simulated force sensation. Accordingly, the user 100 can be caused to perceive that the distance L from the external object 101 to the simulated force sensation presenting apparatus 1 has become less than or equal to the reference distance $L_e$.

Specific Example 2-1

Specific Example 2-1 is an example in which the asymmetrical movement units included in the force sensation presenting mechanism 15 carry out asymmetrical movement based on a temporal change dL/dt in the physical quantity P1 of L and, as a result, the force sensation presenting mechanism 15 presents a simulated force sensation based on that asymmetrical movement (a simulated force sensation based on the temporal change dL/dt in the physical quantity P1 of L). The physical quantity P1 of L is input to the computing unit 13 in this example as well. The computing unit 13 then generates and outputs the control signal CS for causing the user to perceive the simulated force sensation $F_{yv}$, indicated as follows.

$$F_{yv} = k_{yv}(dL/dt) \quad (5)$$

Here, $k_{yv}$ is a positive gain constant. The orientation of the simulated force sensation $F_{yv}$ is the y-axis direction. A simulated force sensation $F_{yv}$ in the direction from the simulated force sensation presenting apparatus 1 toward the external object 101 is expressed by a positive value, whereas a simulated force sensation $F_{yv}$ in the direction from the external object 101 toward the simulated force sensation presenting apparatus 1 is expressed by a negative value. t represents time. dL/dt is a time derivative value of LL with respect to t (i.e., a temporal change in the distance L). Note that this time derivative value can be calculated through a differential method. When the drive signal DS corresponding to such a control signal CS is supplied to the force sensation presenting mechanism 15, the user 100 perceives a simulated force sensation in the manner described below. When the distance L from the external object 101 to the simulated force sensation presenting apparatus 1 changes in a direction that reduces the distance L, the user 100 perceives a simulated force sensation of pushing away from the external object 101 with a force that is greater as the absolute value of the temporal change dL/dt of that distance L increases. On the other hand, when the distance L from the external object 101 to the simulated force sensation presenting apparatus 1 changes in a direction that increases the distance L, the user 100 perceives a simulated force sensation of being pulled back toward the external object 101 with a force that is greater as the absolute value of the temporal change dL/dt of that distance L increases.

Specific Example 2-2

Specific Example 2-2 is also an example in which the asymmetrical movement units included in the force sensation presenting mechanism 15 carry out asymmetrical movement based on a temporal change in the physical quantity P1 of L and, as a result, the force sensation presenting mechanism 15 presents a simulated force sensation based on that asymmetrical movement (a simulated force sensation based on the temporal change in the physical quantity P1 of L). However, the simulated force sensation is presented only when movement of the simulated force sensation presenting apparatus 1 in the y-axis direction is low. In this example, the distance measuring unit 11 measures the distance L, in the y-axis direction, from the simulated force sensation presenting apparatus 1 to the external object 101; the position/attitude measuring unit 12 measures the physical quantity P2 for specifying a speed of the simulated force sensation presenting apparatus 1 along the y-axis (e.g., a position, speed, or acceleration of the simulated force sensation presenting apparatus 1 along the y-axis); and the physical quantity P1 of L and the physical quantity P2 are input to the computing unit 13. The computing unit 13 then generates and outputs the control signal CS for causing the user to perceive the simulated force sensation $F_{yv}$ indicated as follows.

$$F_{yv} = k_{yv}(dL/dt) \text{ for abs}(dy/dt) \ge y'_s \quad (6)$$

$$F_{yv} = 0 \text{ for abs}(dy/dt) > y'_s \quad (7)$$

Here, dy/dt is a time derivative value of a y-axis position y, of the simulated force sensation presenting apparatus 1, with respect to t (i.e., a speed in which the simulated force sensation presenting apparatus 1 moves in the y-axis direction). $abs(\alpha)$ represents the absolute value of $\alpha$. $y'_s$ represents a predetermined positive threshold. The orientation of the simulated force sensation $F_{yv}$ is the y-axis direction. A simulated force sensation $F_{yv}$ in the direction from the simulated force sensation presenting apparatus 1 toward the external object 101 is expressed by a positive value, whereas a simulated force sensation $F_{yv}$ in the direction from the external object 101 toward the simulated force sensation presenting apparatus 1 is expressed by a negative value. When the drive signal DS corresponding to such a control signal CS is supplied to the force sensation presenting mechanism 15, the user 100 perceives a simulated force sensation in the manner described below. In other words, when the absolute value of the speed dy/dt at which the simulated force sensation presenting apparatus 1 moves in the y-axis direction is less than or equal to y'$_s$, the user 100 perceives the same simulated force sensation as in Specific Example 2-1. On the other hand, when the absolute value of the speed dy/dt at which the simulated force sensation presenting apparatus 1 moves in the y-axis direction is greater than y'$_s$, the user 100 does not perceive a simulated force sensation.

Specific Example 3-1

Specific Example 3-1 is an example in which the asymmetrical movement units included in the force sensation presenting mechanism 15 carry out asymmetrical movement based on the temporal change dL/dt in the physical quantity P1 of L and a temporal change dx/dt in the position, in the x-axis direction, of the simulated force sensation presenting apparatus 1 and, as a result, the force sensation presenting mechanism 15 presents a simulated force sensation based on that asymmetrical movement (a simulated force sensation based on the temporal change dL/dt in the physical quantity P1 of L and the temporal change dx/dt in the position, in the x-axis direction, of the simulated force sensation presenting apparatus 1). In this example, the distance measuring unit 11 measures the distance L, in the y-axis direction, from the simulated force sensation presenting apparatus 1 to the external object 101; the position/attitude measuring unit 12 measures the physical quantity P2 for specifying a speed at which the simulated force sensation presenting apparatus 1 moves along the x-axis (e.g., a position, speed, or acceleration of the simulated force sensation presenting apparatus 1 along the x-axis); and the physical quantity P1 of L and the physical quantity P2 are input to the computing unit 13. The computing unit 13 then generates and outputs the control signal CS for causing the user to perceive the simulated force sensation $F_{xv}$, indicated as follows.

[Formula 1]

$$F_{xv} = k_{xv} \frac{dL}{dt} \frac{dx}{dt} \quad (8)$$

Figure 5:
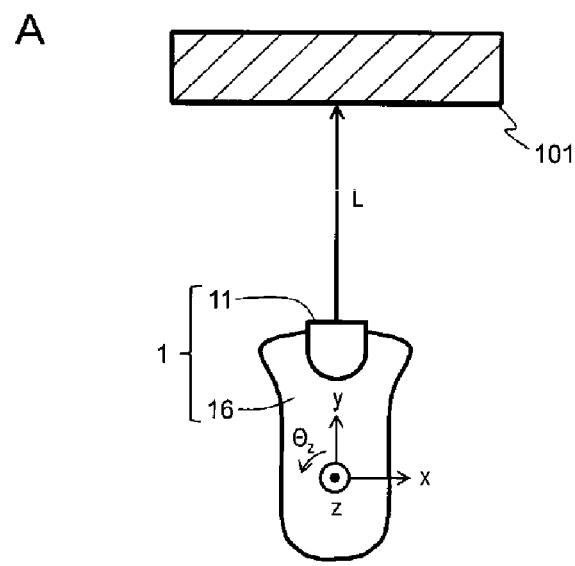
FIG. 5A and FIG. 5B are conceptual diagrams illustrating operations of the simulated force sensation presenting apparatus according to the embodiment.
Figure 5:
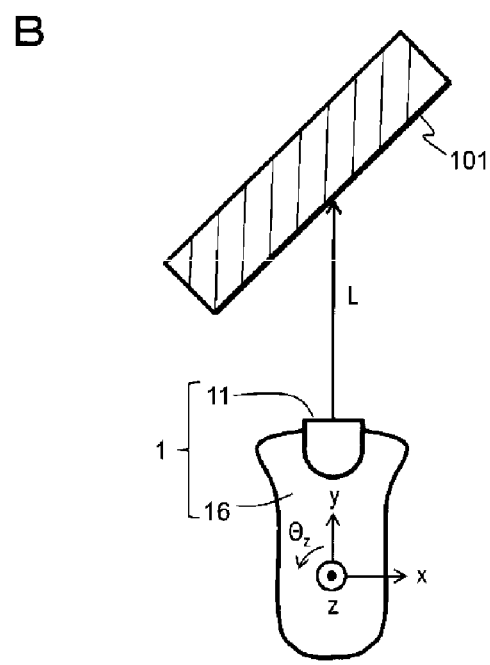
Figure 6:
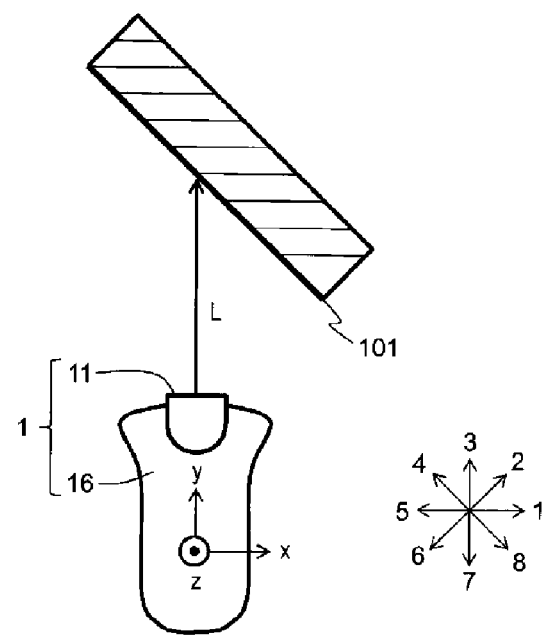
FIG. 6A and FIG. 6B are conceptual diagrams illustrating operations of the simulated force sensation presenting apparatus according to the embodiment.
Figure 6:
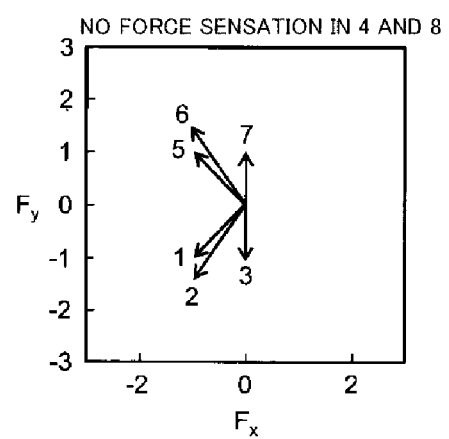
Figure 7:
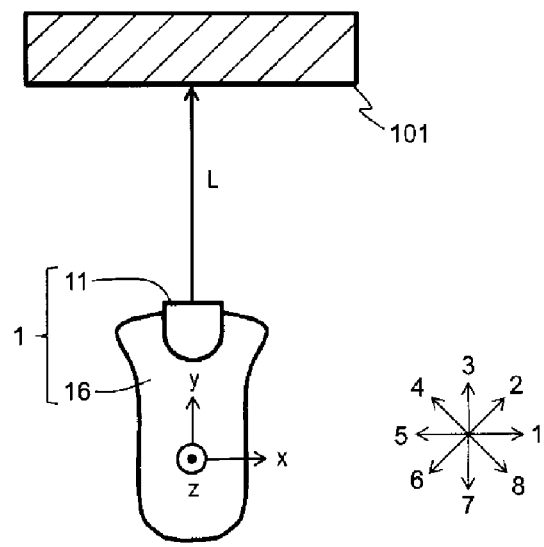
FIG. 7A and FIG. 7B are conceptual diagrams illustrating operations of the simulated force sensation presenting apparatus according to the embodiment.
Figure 7:
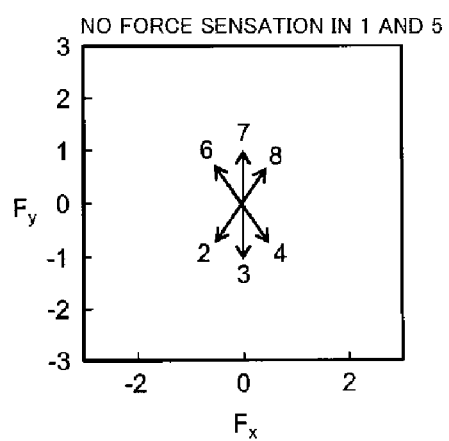
Figure 8:
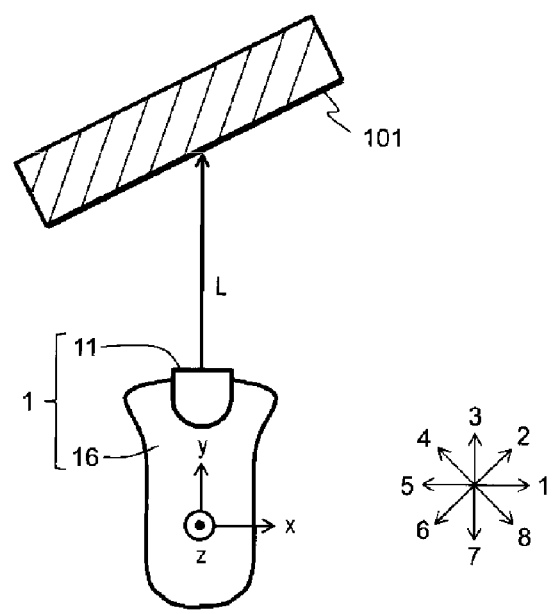
FIG. 8A and FIG. 8B are conceptual diagrams illustrating operations of the simulated force sensation presenting apparatus according to the embodiment.
Figure 8:
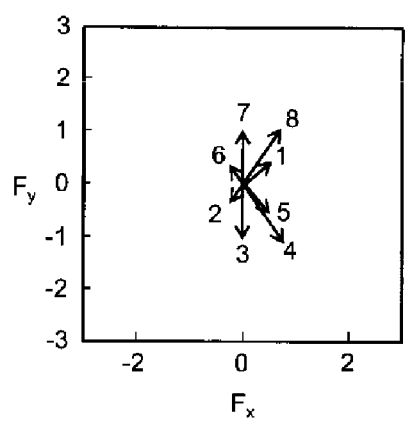
Figure 9:
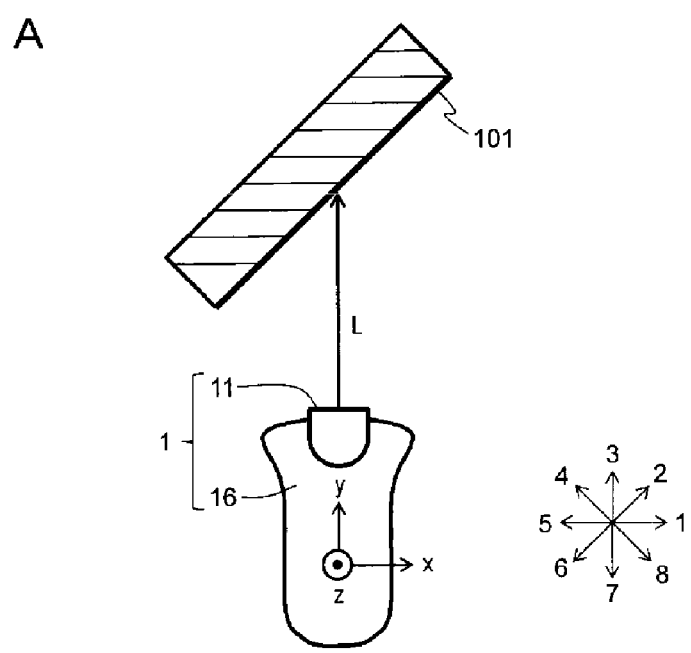
FIG. 9A and FIG. 9B are conceptual diagrams illustrating operations of the simulated force sensation presenting apparatus according to the embodiment.
Figure 9:
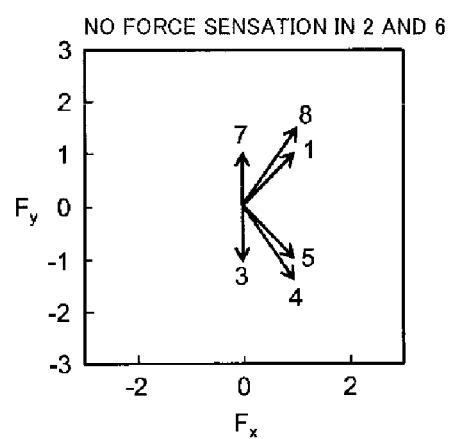
Figure 10:
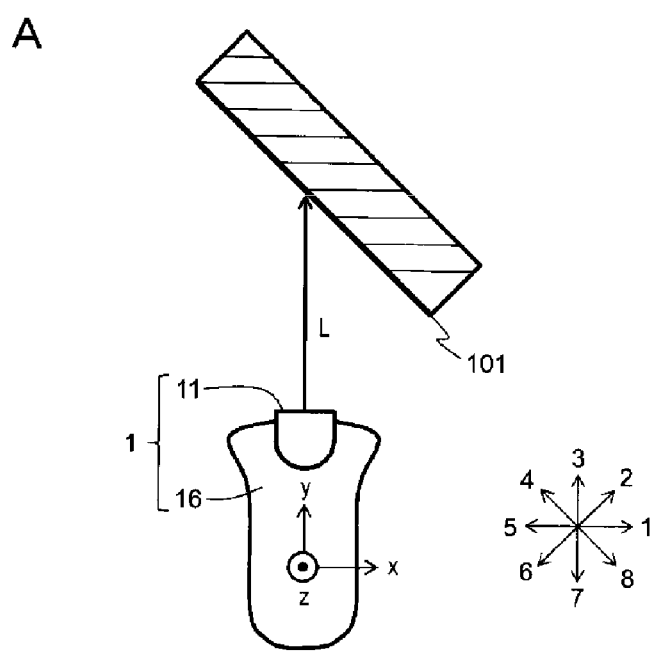
FIG. 10A and FIG. 10B are conceptual diagrams illustrating operations of the simulated force sensation presenting apparatus according to the embodiment.
Figure 10:
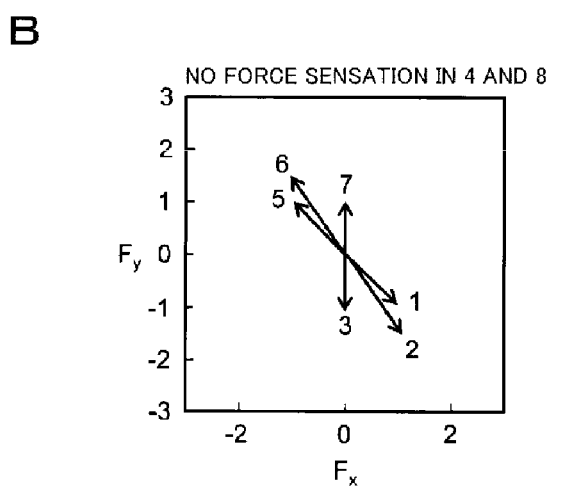
Figure 11:
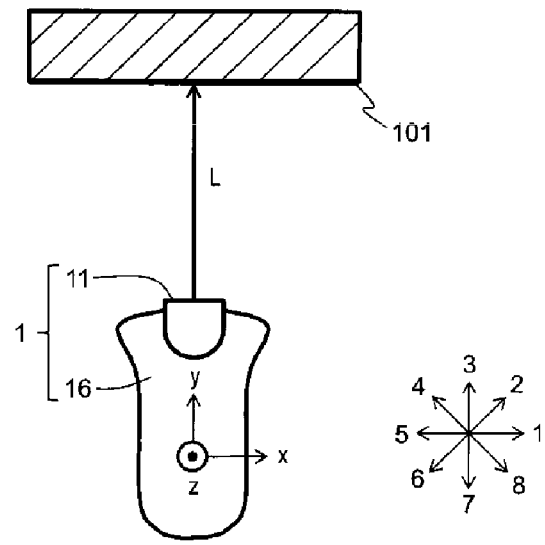
FIG. 11A and FIG. 11B are conceptual diagrams illustrating operations of the simulated force sensation presenting apparatus according to the embodiment.
Figure 11:
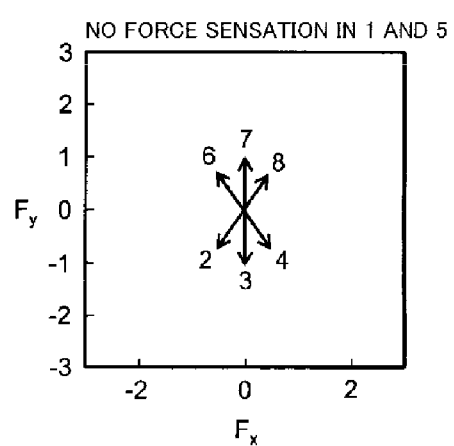
Figure 12:
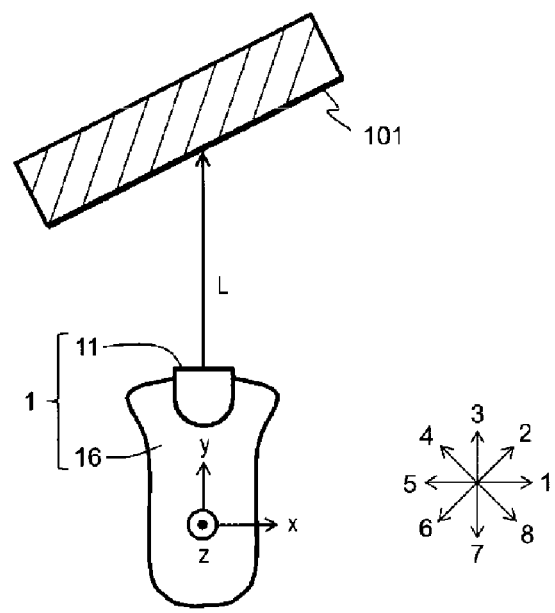
FIG. 12A and FIG. 12B are conceptual diagrams illustrating operations of the simulated force sensation presenting apparatus according to the embodiment.
Figure 12:
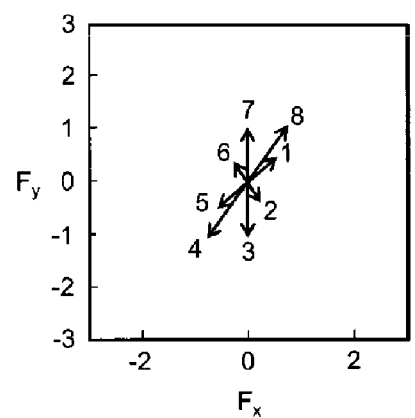
Figure 13:
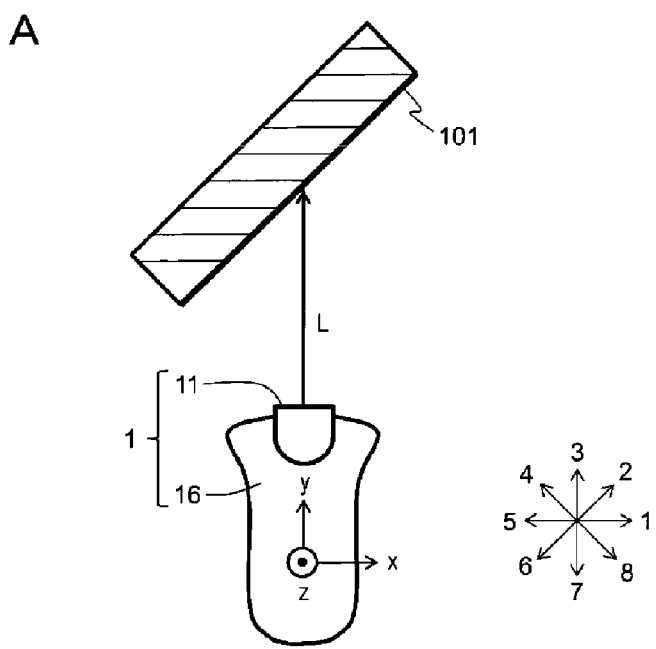
FIG. 13A and FIG. 13B are conceptual diagrams illustrating operations of the simulated force sensation presenting apparatus according to the embodiment.
Figure 13:
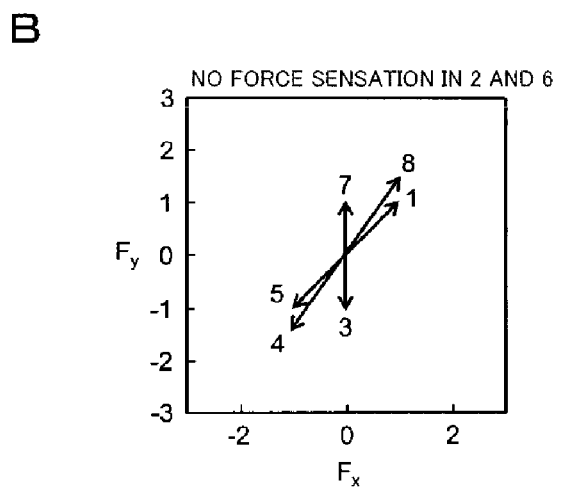

Here, $k_{xv}$ is a positive gain constant. The orientation of the simulated force sensation $F_{xv}$ is the x-axis direction. dx/dt is a time derivative value of an x-axis position x, of the simulated force sensation presenting apparatus 1, with respect to t (i.e., a speed in which the simulated force sensation presenting apparatus 1 moves in the x-axis direction). The orientation of the simulated force sensation $F_{xv}$ is the x-axis direction. In FIG. 5A and FIG. 5B, a simulated force sensation $F_{xv}$ in the right direction is expressed by a positive value, and a simulated force sensation $F_{xv}$ in the left direction is expressed by a negative value. When the drive signal DS corresponding to such a control signal CS is supplied to the force sensation presenting mechanism 15, the user 100 perceives a simulated force sensation in the manner described below. When dL/dt and dx/dt are either both positive or both negative, the user 100 perceives a simulated force sensation in the direction in which the x-axis value increases (the right direction). When either dL/dt or dx/dt is negative, the user 100 perceives a simulated force sensation in the direction in which the x-axis value decreases (the left direction). Note that the simulated force sensations in both directions become stronger as the absolute value of dL/dt increases and the absolute value of dx/dt increases. Accordingly, the magnitude of the simulated force sensation also increases the faster the simulated force sensation presenting apparatus 1 is moved in the x-axis direction, and the magnitude of the simulated force sensation also increases as the temporal change in L increases.

Specific Example 3-2

Specific Example 3-2 is an example in which the temporal change dx/dt in the position, in the x-axis direction, of the simulated force sensation presenting apparatus 1, described in Specific Example 3-1, is approximated with a temporal change dΘ/dt in an angular velocity $Θ_z$, about the z-axis, of the simulated force sensation presenting apparatus 1. In other words, Specific Example 3-2 is an example in which the force sensation presenting mechanism 15 carries out asymmetrical movement based on the temporal change dL/dt in the physical quantity P1 of L and the temporal change dΘ$_z$/dt in the angular velocity $Θ_z$, about the z-axis, of the simulated force sensation presenting apparatus 1, and a simulated force sensation based on that asymmetrical movement (a simulated force sensation based on the temporal change dL/dt in the physical quantity P1 of L and the temporal change dΘ$_z$/dt in the angular velocity, about the z-axis, of the simulated force sensation presenting apparatus 1). Although complex calculations using a Kalman filter or the like are needed in order to obtain the temporal change dx/dt in a position in an axial direction, the temporal change dΘ$_z$/dt in the angular velocity can be calculated easily by using a simple sensor, such as a gyrosensor, as the position/attitude measuring unit 12. Thus Specific Example 3-2 can simplify the configuration of the simulated force sensation presenting apparatus 1 as compared to Specific Example 3-1. In this example, the distance measuring unit 11 measures the distance L, in the y-axis direction, from the simulated force sensation presenting apparatus 1 to the external object 101; the position/attitude measuring unit 12 measures the physical quantity P2 for specifying the temporal change dΘ$_z$/dt of the angular velocity, about the z-axis, of the simulated force sensation presenting apparatus 1 (e.g., a position, speed, or acceleration of the simulated force sensation presenting apparatus 1 along the x-axis); and the physical quantity P1 of L and the physical quantity P2 are input to the computing unit 13. The computing unit 13 then generates and outputs the control signal CS for causing the user to perceive the simulated force sensation $F_{xv}$, indicated as follows.

[Formula 2]

$$F_{xv} = -k_{xv} \frac{dL}{dt} \frac{dθ_z}{dt} \quad (9)$$

Note, however, that as illustrated in FIG. 5A and FIG. 5B, the angular velocity $Θ_z$ about the z-axis takes the clockwise direction when viewed in the z-axis direction (the direction facing toward the viewer of FIG. 5a and FIG. 5B) (counterclockwise, in FIG. 5A and FIG. 5B) as the forward direction.

Specific Example 3-3

Specific Example 3-3 is an example in which the asymmetrical movement units included in the force sensation presenting mechanism 15 carry out asymmetrical movement based on the absolute value of the temporal change dL/dt in the physical quantity P1 of L and the temporal change dx/dt in the position, in the x-axis direction, of the simulated force sensation presenting apparatus 1 and, as a result, the force sensation presenting mechanism 15 presents a simulated force sensation based on that asymmetrical movement (a simulated force sensation based on the absolute value of the temporal change dL/dt in the physical quantity P1 of L and the temporal change dx/dt in the position, in the x-axis direction, of the simulated force sensation presenting apparatus 1). In this example, the distance measuring unit 11 measures the distance L, in the y-axis direction, from the simulated force sensation presenting apparatus 1 to the external object 101; the position/attitude measuring unit 12 measures the physical quantity P2 for specifying a speed at which the simulated force sensation presenting apparatus 1 moves along the x-axis (e.g., a position, speed, or acceleration of the simulated force sensation presenting apparatus 1 along the x-axis); and the physical quantity P1 of L and the physical quantity P2 are input to the computing unit 13. The computing unit 13 then generates and outputs the control signal CS for causing the user to perceive the simulated force sensation $F_{xv}$, indicated as follows.

[Formula 3]

$$F_{xv} = k_{xv} \text{abs}\left(\frac{dL}{dt}\right)\frac{dx}{dt} \tag{10}$$

When the drive signal DS corresponding to such a control signal CS is supplied to the force sensation presenting mechanism 15, the user 100 perceives a simulated force sensation in the manner described below. When dx/dt is positive or negative, the user 100 perceives a simulated force sensation in the direction in which the x-axis value increases (the right direction). When dx/dt is negative, the user 100 perceives a simulated force sensation in the direction in which the x-axis value decreases (the left direction). Note that the simulated force sensations in both directions become stronger as the absolute value of dL/dt increases and the absolute value of dx/dt increases. Accordingly, the magnitude of the simulated force sensation also increases the faster the simulated force sensation presenting apparatus 1 is moved in the x-axis direction, and the magnitude of the simulated force sensation also increases as the temporal change in L increases.

Specific Example 3-4

Specific Example 3-4 is an example in which the temporal change dx/dt in the position, in the x-axis direction, of the simulated force sensation presenting apparatus 1, described in Specific Example 3-3, is approximated with a temporal change $d\Theta_z/dt$ in an angular velocity $\Theta_z$, about the z-axis, of the simulated force sensation presenting apparatus 1. In this example, the distance measuring unit 11 measures the distance L, in the y-axis direction, from the simulated force sensation presenting apparatus 1 to the external object 101; the position/attitude measuring unit 12 measures the physical quantity P2 for specifying the temporal change $d\Theta_z/dt$ of the angular velocity, about the z-axis, of the simulated force sensation presenting apparatus 1; and the physical quantity P1 of L and the physical quantity P2 are input to the computing unit 13. The computing unit 13 then generates and outputs the control signal CS for causing the user to perceive the simulated force sensation $F_{xv}$, indicated as follows.

[Formula 4]

$$F_{xv} = -k_{xv} \text{abs}\left(\frac{dL}{dt}\right)\frac{d\theta_z}{dt} \tag{11}$$

Specific Example 4-1

A result of combining components of the above-described simulated force sensations $F_{yp}$ and $F_{yv}$ may be presented in the y-axis direction, and the simulated force sensation $F_{xv}$ may be presented in the x-axis direction. For example, the computing unit 13 may generate and output the control signal CS for causing the user to perceive the simulated force sensations $F_y$ and $F_x$, indicated as follows.

$$F_y = F_{yp} + F_{yv} \tag{12}$$

$$F_x = F_{xv} \tag{13}$$

The orientation of the simulated force sensation $F_y$ is the y-axis direction. A simulated force sensation $F_y$ in the direction from the simulated force sensation presenting apparatus 1 toward the external object 101 is expressed by a positive value, whereas a simulated force sensation $F_y$ in the direction from the external object 101 toward the simulated force sensation presenting apparatus 1 is expressed by a negative value. The orientation of the simulated force sensation $F_x$ is the x-axis direction. In FIG. 5A and FIG. 5B, a simulated force sensation $F_x$ in the right direction is expressed by a positive value, and a simulated force sensation $F_x$ in the left direction is expressed by a negative value.

Specific Example 4-2

In Specific Example 4-1, $F_y$ may be equal to $F_{yp}$, and $F_y$ may be equal to $F_{yv}$.

Specific Example 5-1

Taking into account saturation characteristics, the computing unit 13 may generate and output the control signal CS for causing the user to perceive simulated force sensations $F'_y$ and $F'_x$ obtained by subjecting the simulated force sensations $F_y$ and $F_x$ of Specific Examples 4 to nonlinear conversion. For example, the computing unit 13 may generate and output the control signal CS for causing the user to perceive the simulated force sensations $F'_y$ and $F'_x$, which are sigmoid function values of $F_y$ and $F_x$, indicated as follows.

[Formula 5]

$$F'_y = k_{gy2} \frac{1 - \exp(-k_{gy1} F_y)}{1 + \exp(-k_{gy1} F_y)} \tag{12}$$

[Formula 6]

$$F'_x = k_{gx2} \frac{1 - \exp(-k_{gx1} F_x)}{1 + \exp(-k_{gx1} F_x)} \tag{13}$$

Here, $k_{gy1}$, $k_{gy2}$, $k_{gx1}$, and $k_{gx2}$ are positive gain constants. $\exp(\alpha)$ is an exponential function value of $\alpha$. The orientation of the simulated force sensation $F_y$ is the y-axis direction. A simulated force sensation $F'_y$ in the direction from the simulated force sensation presenting apparatus 1 toward the external object 101 is expressed by a positive value, whereas a simulated force sensation $F'_y$ in the direction from the external object 101 toward the simulated force sensation presenting apparatus 1 is expressed by a negative value. The orientation of the simulated force sensation $F'_x$ is the x-axis direction. In FIG. 5A and FIG. 5B, a simulated force sensation $F'_x$ in the right direction is expressed by a positive value, and a simulated force sensation $F'_x$ in the left direction is expressed by a negative value. This makes it possible to match the presented simulated force sensation to the dynamic range of perception.

Specific Example 5-2

The computing unit 13 may generate and output the control signal CS for causing the user to perceive the simulated force sensation $F'_y$ expressed by a piecewise linear function value of $F_y$, indicated as follows.

$$F'_y = F_y \text{ for } -F_y^{max} < F_y < F_y^{max} \tag{14}$$

$$F'_y = F_y^{max} \text{ for } F_y^{max} \leq F_y \tag{15}$$

$$F'_y = -F_y^{max} \text{ for } -F_y^{max} \geq F_y \tag{16}$$

Here, $F_y^{max}$ is the maximum value of the simulated force sensation $F_y$.

Specific Example 5-3

In Specific Examples 5-1 and 5-2, $F_y$ may be equal to $F_{yp}$, and $F_y$ may be equal to $F_{yv}$.

As described in the examples above, the force sensation presenting mechanism 15 may carry out asymmetrical movement based on the physical quantity P1 of L and present a simulated force sensation based on the physical quantity P1 of L (mode A; Specific Examples 1-1 and 1-2), or the force sensation presenting mechanism 15 may carry out asymmetrical movement based on the temporal change in the physical quantity P1 of L and present a simulated force sensation based on the temporal change in the physical quantity P1 of L (mode B; Specific Examples 2-1 and 2-2). Additionally, the force sensation presenting mechanism 15 may carry out asymmetrical movement based on the amounts listed below, which have been obtained by measuring the movement of the simulated force sensation presenting apparatus 1, and may then present a simulated force sensation based on those amounts. The "amounts" referred to here are (a) at least one of the physical quantity P2, the function value of the physical quantity P2, the third physical quantity P3 obtained by measuring the attitude of the simulated force sensation presenting apparatus 1, and the function value of the physical quantity P3, and (b) the temporal change in the physical quantity P1 of L (mode C; Specific Examples 3-1, 3-2, 3-3, and 3-4). Furthermore, the force sensation presenting mechanism 15 may present the result of combining at least some of the simulated force sensations from modes A to C, or the force sensation presenting mechanism 15 may present the result of carrying out nonlinear conversion on, and then combining, at least some of the simulated force sensations from modes A to C (mode D; Specific Examples 4-1, 4-2, 5-1, 5-2, 5-3).

Example 1 of Relationship Between Positional Relationship and Simulated Force Sensation A relationship between the positional relationship between the external object 101 and the simulated force sensation presenting apparatus 1, and the simulated force sensation presented by the simulated force sensation presenting apparatus 1, will be described. FIG. 6A to FIG. 9B are examples of a case where the simulated force sensation presenting apparatus 1 presents the simulated force sensation $F_y$ of $F_{yv}$ in the y-axis direction, as per Equation (5), and presents the simulated force sensation $F_x$ of $F_{xV}$ in the x-axis direction, as per Equation (8). The numbers from 1 to 8 in FIG. 6A, FIG. 7A, FIG. 8A, and FIG. 9A represent directions in an x-y plane. FIG. 6B, FIG. 7B, FIG. 8B, and FIG. 9B illustrate the combined simulated force sensations $F_y$ and $F_x$, presented by the simulated force sensation presenting apparatus 1, as vectors, when the simulated force sensation presenting apparatus 1 and the external object 101, which is a wall, are in the positional relationship illustrated in FIG. 6B, FIG. 7B, FIG. 8B, and FIG. 9B, and the simulated force sensation presenting apparatus 1 moves parallel to the directions in the x-y plane, represented by the numbers 1 to 8 as described above, at a unit speed. The external object 101 is stationary. Numbers representing the movement directions of the simulated force sensation presenting apparatus 1 are appended to the corresponding vectors. As illustrated in these diagrams, when the simulated force sensation presenting apparatus 1 moves in a direction which increases the distance L to the external object 101 (the directions 5, 6, and 7 in FIG. 6A; the directions 6, 7, and 8 in FIG. 7A; the directions 1, 6, 7, and 8 in FIG. 8A; and the directions 1, 7, and 8 in FIG. 9A), the simulated force sensation presenting apparatus 1 presents a simulated force sensation having a component in the direction opposite from the y-axis component of the movement direction and an x-axis direction component of the movement direction (the direction components 5, 6, and 7 in FIG. 6B; the direction components 6, 7, and 8 in FIG. 7B; the direction components 1, 6, 7, and 8 in FIG. 8B; and the direction components 1, 7, and 8 in FIG. 9B). On the other hand, when the simulated force sensation presenting apparatus 1 moves in a direction which reduces the distance L to the external object 101 (the directions 1, 2, and 3 in FIG. 6A; the directions 2, 3, and 4 in FIG. 7A; the directions 2, 3, 4, and 5 in FIG. 8A; and the directions 3, 4, and 5 in FIG. 9A), the simulated force sensation presenting apparatus 1 presents a simulated force sensation having a component in the direction opposite from the y-axis component of the movement direction and a component opposite from the x-axis direction component of the movement direction (the direction components 1, 2, and 3 in FIG. 6B; the direction components 2, 3, and 4 in FIG. 7B; the direction components 2, 3, 4, and 5 in FIG. 8B; and the direction components 3, 4, and 5 in FIG. 9B). A simulated force sensation is not presented when the simulated force sensation presenting apparatus 1 moves in the directions indicated by 4 and 8 in FIG. 6A, the direction indicated by 1 and 5 in FIG. 7A, and the directions indicated by 2 and 6 in FIG. 9A.

Example 2 of Relationship Between Positional Relationship and Simulated Force Sensation FIG. 10A to FIG. 13B are examples of a case where the simulated force sensation presenting apparatus 1 presents the simulated force sensation $F_y$ of $F_{yv}$ in the y-axis direction, as per Equation (5), and presents the simulated force sensation $F_x$ of $F_{xV}$ in the x-axis direction, as per Equation (10). The numbers from 1 to 8 in FIG. 10A, FIG. 11A, FIG. 12A, and FIG. 13A represent directions in an x-y plane. FIG. 10B, FIG. 11B, FIG. 12B, and FIG. 13B illustrate the combined simulated force sensations $F_y$ and $F_x$, presented by the simulated force sensation presenting apparatus 1, as vectors, when the simulated force sensation presenting apparatus 1 and the external object 101, which is a wall, are in the positional relationship illustrated in FIG. 10B, FIG. 11B, FIG. 12B, and FIG. 13B, and the simulated force sensation presenting apparatus 1 moves parallel to the directions in the x-y plane, represented by the numbers 1 to 8 as described above, at a unit speed. The external object 101 is stationary. Numbers representing the movement directions of the simulated force sensation presenting apparatus 1 are appended to the corresponding vectors. In these examples, the simulated force sensation presenting apparatus 1 presents a simulated force sensation having a component in the direction opposite from the y-axis component of the movement direction and an x-axis direction component of the movement direction, regardless of in which direction the simulated force sensation presenting apparatus 1 is moving. A simulated force sensation is not presented when the simulated force sensation presenting apparatus 1 moves in the directions indicated by 4 and 8 in FIG. 10A, the direction indicated by 1 and 5 in FIG. 11A, and the directions indicated by 2 and 6 in FIG. 13A.

Figure 14:
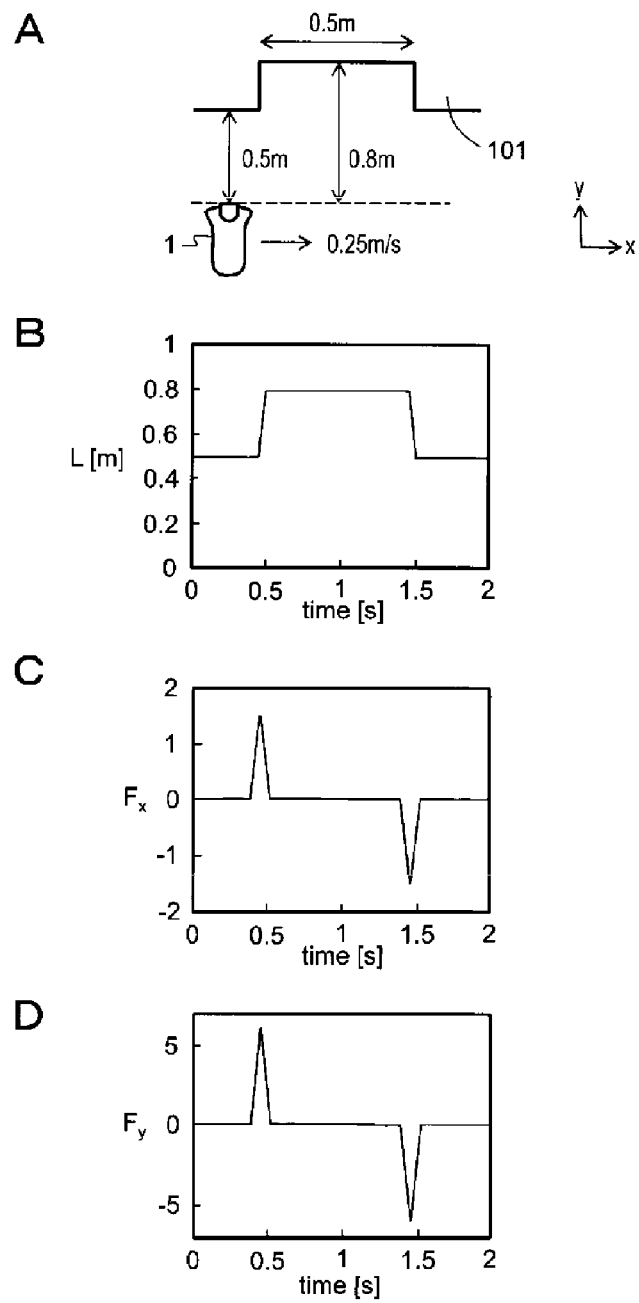
FIG. 14A to FIG. 14D are conceptual diagrams illustrating operations of the simulated force sensation presenting apparatus according to the embodiment.
Figure 15:
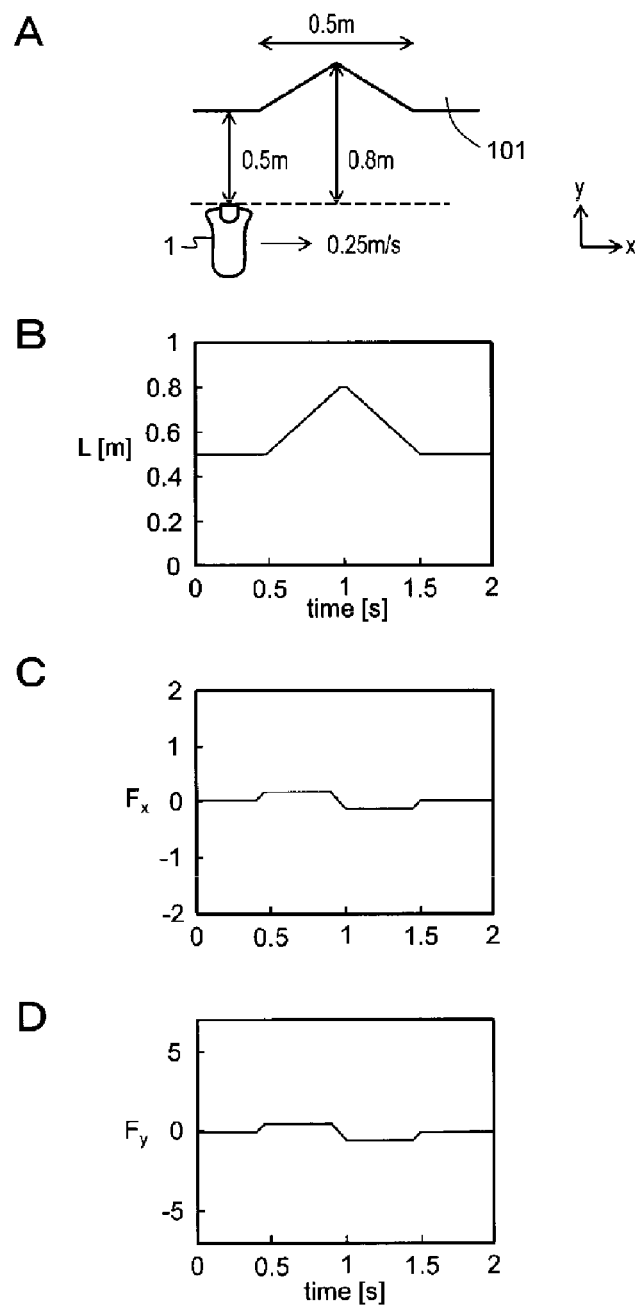
FIG. 15A to FIG. 15D are conceptual diagrams illustrating operations of the simulated force sensation presenting apparatus according to the embodiment.
Figure 16:
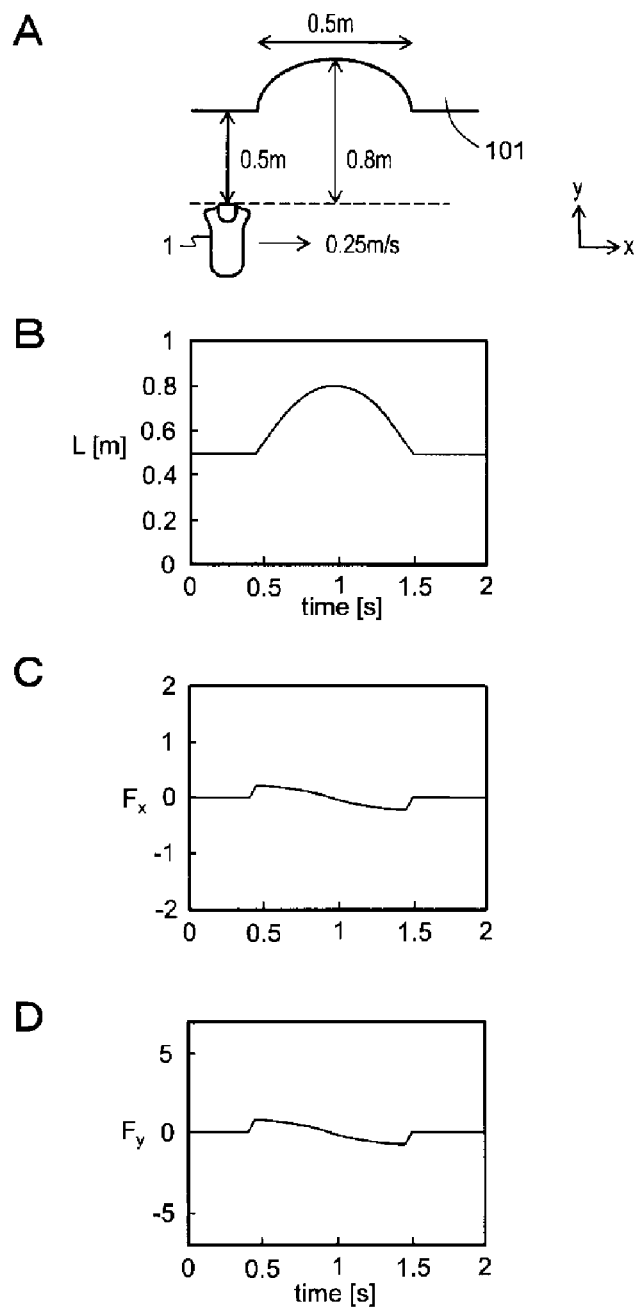
FIG. 16A to FIG. 16D are conceptual diagrams illustrating operations of the simulated force sensation presenting apparatus according to the embodiment.

Example 1 of Relationship Between Shape of External Object 101 and Simulated Force Sensation A relationship between the shape of the external object 101 and the simulated force sensation presented by the simulated force sensation presenting apparatus 1 will be given here. FIG. 14A to FIG. 16D are examples of a case where the simulated force sensation presenting apparatus 1 presents the simulated force sensation $F_y$ of $F_{yv}$ in the y-axis direction, as per Equation (5), and presents the simulated force sensation $F_x$ of $F_{xV}$ in the x-axis direction, as per Equation (8). FIG. 14B to FIG. 14D illustrate examples of a relationship between time (s) and the distance L (m) from the simulated force sensation presenting apparatus 1 to the external object 101, the simulated force sensation $F_x$, and the simulated force sensation $F_y$, respectively, in a case where the simulated force sensation presenting apparatus 1 is moved in the x-axis direction, at a speed of 0.25 m/s, relative to an external object 101 having a recess which has a rectangular cross-sectional shape (a recess in the y-axis direction) as illustrated in FIG. 14A. With the external object 101 having a recess which has a rectangular cross-sectional shape, when the simulated force sensation presenting apparatus 1 has arrived at the recess, simulated force sensations $F_x$ and $F_y$, which pull the simulated force sensation presenting apparatus 1 toward the external object 101 are presented ($F_x$ and $F_y$ are both positive). As a result, the user 100 can feel a sensation that the simulated force sensation presenting apparatus 1 is falling into the recess in the external object 101 in the y-axis direction, and accelerates more in the x-axis direction. This resembles the sensation felt when running one's hand along the external object 101. The simulated force sensations $F_x$ and $F_y$ are 0 at the point in time when the simulated force sensation presenting apparatus 1 opposes the recess. Then, once the simulated force sensation presenting apparatus 1 has reached the end of the recess, a simulated force sensation which pushes the simulated force sensation presenting apparatus 1 away from the external object 101 and pushes in the direction opposite from the direction in which the simulated force sensation presenting apparatus 1 is traveling is presented ($F_x$ and $F_y$ are both negative). As a result, the user 100 can feel a sensation that the simulated force sensation presenting apparatus 1 is decelerating in the x-axis direction and is being pushed back in the y-axis direction at the end of the recess in the external object 101. This also resembles the sensation felt when running one's hand along the external object 101. FIG. 15B to FIG. 15D illustrate examples of a relationship between time (s) and the distance L (m) from the simulated force sensation presenting apparatus 1 to the external object 101, the simulated force sensation $F_x$, and the simulated force sensation $F_y$, respectively, in a case where the simulated force sensation presenting apparatus 1 is moved in the x-axis direction, at a speed of 0.25 m/s, relative to an external object 101 having a recess which has a wedge-shaped cross-sectional shape (a recess in the y-axis direction) as illustrated in FIG. 15A. With the external object 101 having a wedge-shaped cross-sectional shape, positive simulated force sensations $F_x$ and $F_y$ are presented continuously from when the simulated force sensation presenting apparatus 1 reaches the recess to when the simulated force sensation presenting apparatus 1 arrives at a position opposing the deepest part of the recess. Negative simulated force sensations $F_x$ and $F_y$ are then presented continuously until the simulated force sensation presenting apparatus 1 arrives at the end of the recess. FIG. 16B to FIG. 16D illustrate examples of a relationship between time (s) and the distance L (m) from the simulated force sensation presenting apparatus 1 to the external object 101, the simulated force sensation $F_x$, and the simulated force sensation $F_y$, respectively, in a case where the simulated force sensation presenting apparatus 1 is moved in the x-axis direction, at a speed of 0.25 m/s, relative to an external object 101 having a recess which has semicircular cross-sectional shape (a recess in the y-axis direction) as illustrated in FIG. 16A. With the external object 101 having a semicircular cross-sectional shape, positive simulated force sensations $F_x$ and $F_y$ are presented continuously from when the simulated force sensation presenting apparatus 1 reaches the recess to when the simulated force sensation presenting apparatus 1 arrives at a position opposing the deepest part of the recess. Negative simulated force sensations $F_x$ and $F_y$ are then presented continuously until the simulated force sensation presenting apparatus 1 arrives at the end of the recess. However, with a recess having a semicircular cross-sectional shape, the distance L changes continuously, and thus the magnitudes of the simulated force sensations $F_x$ and $F_y$ change continuously. As described above, the simulated force sensations $F_x$ and $F_y$ make it possible for the user 100 to clearly perceive the shape of the external object 101.

Figure 17:
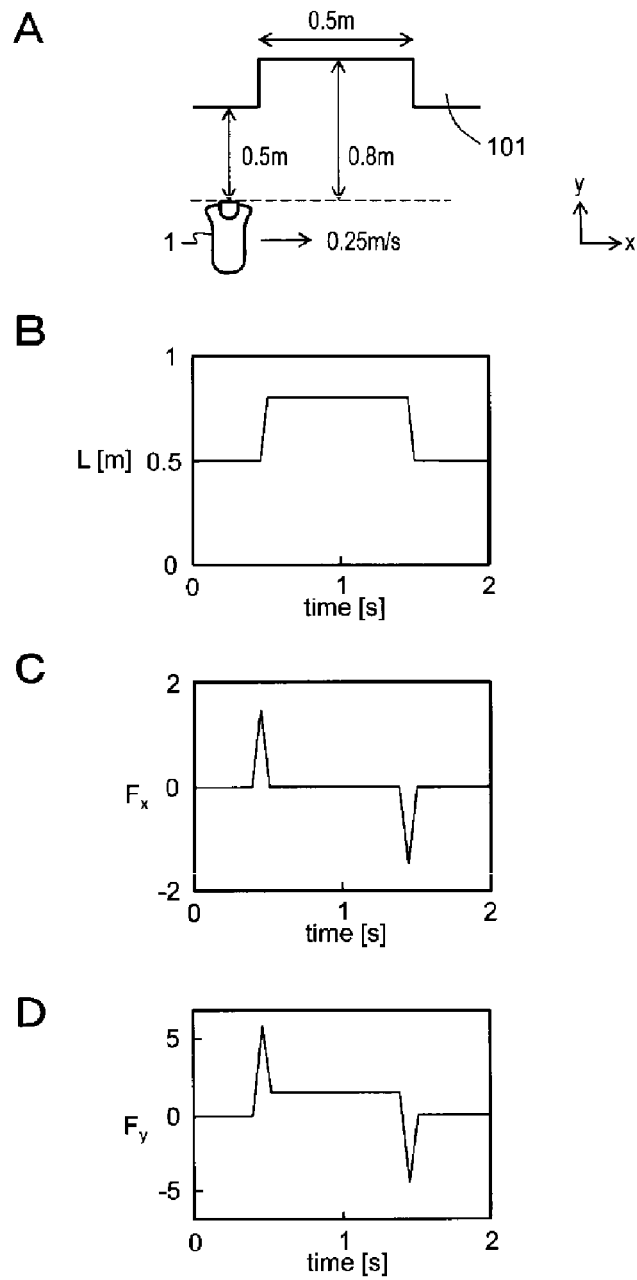
FIG. 17A to FIG. 17D are conceptual diagrams illustrating operations of the simulated force sensation presenting apparatus according to the embodiment.
Figure 18:
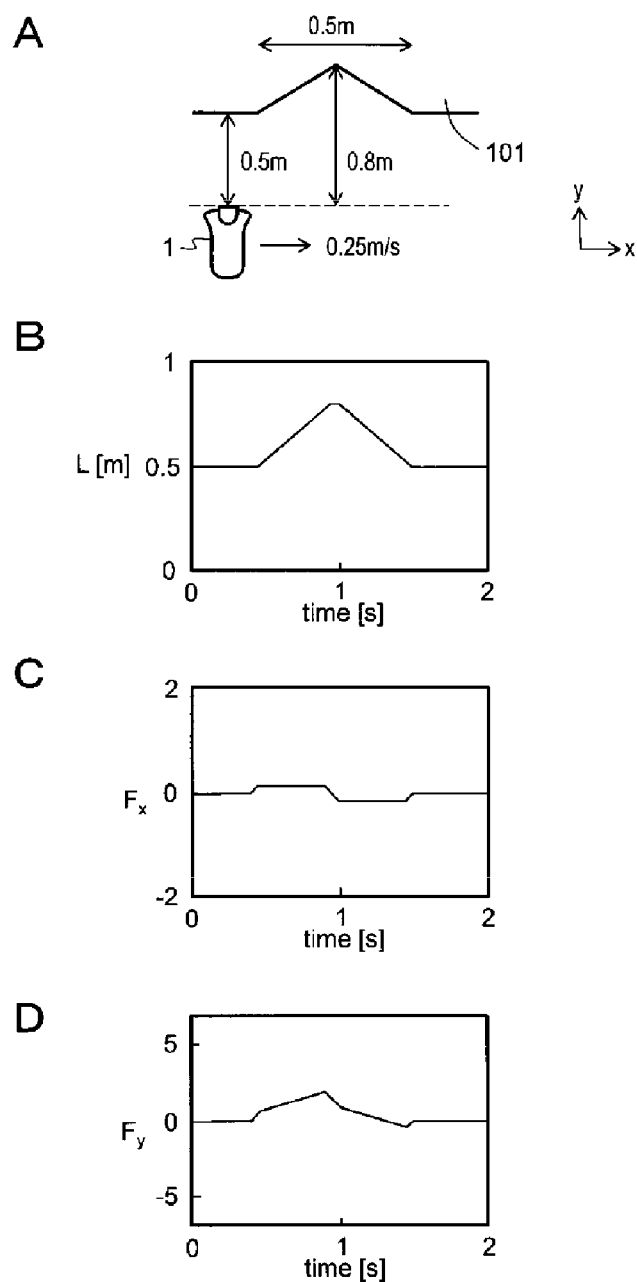
FIG. 18A to FIG. 18D are conceptual diagrams illustrating operations of the simulated force sensation presenting apparatus according to the embodiment.
Figure 19:
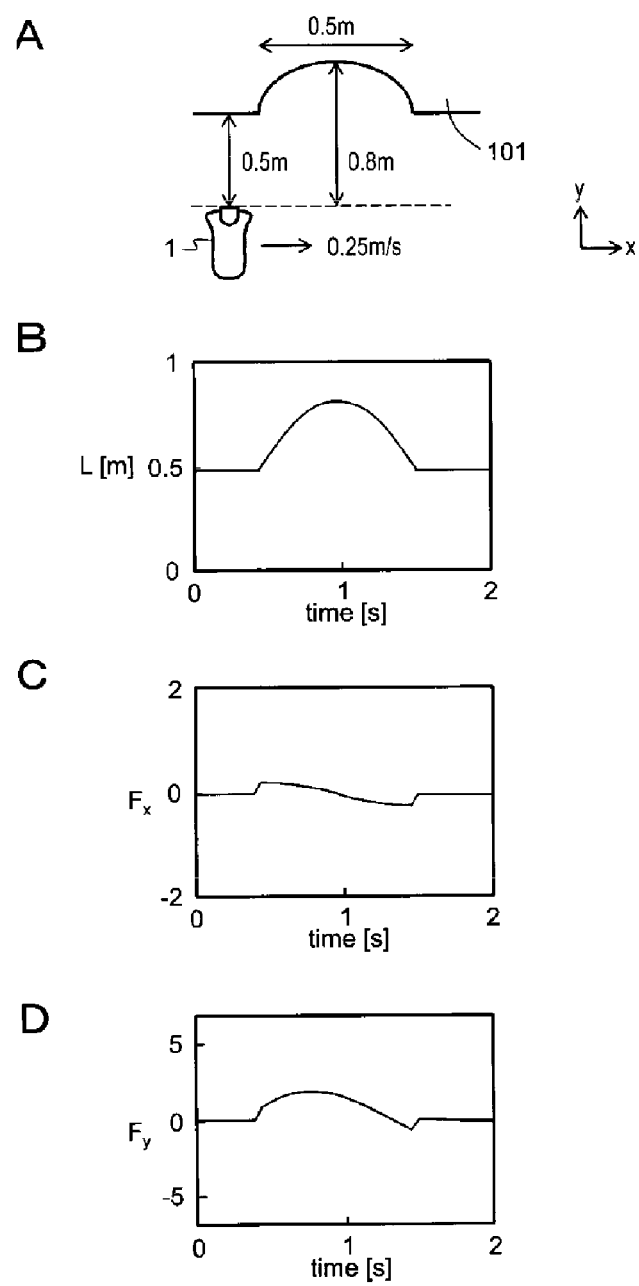
FIG. 19A to FIG. 19D are conceptual diagrams illustrating operations of the simulated force sensation presenting apparatus according to the embodiment.

Example 2 of Relationship Between Shape of External Object 101 and Simulated Force Sensation Another example will be described. FIG. 17A to FIG. 19D are examples of a case where the simulated force sensation presenting apparatus 1 presents the simulated force sensation $F_y$ of $F_{yp}+F_{yv}$, obtained by combining the simulated force sensations of Equations (1) and (2) and Equation (5), in the y-axis direction, and presents the simulated force sensation $F_x$ of $F_{xv}$ in the x-axis direction, as per Equation (8). FIG. 17B to FIG. 17D illustrate examples of a relationship between time (s) and the distance L (m) from the simulated force sensation presenting apparatus 1 to the external object 101, the simulated force sensation $F_x$, and the simulated force sensation $F_y$, respectively, in a case where the simulated force sensation presenting apparatus 1 is moved in the x-axis direction, at a speed of 0.25 m/s, relative to an external object 101 having a recess which has a rectangular cross-sectional shape (a recess in the y-axis direction) as illustrated in FIG. 17A. With the external object 101 having a recess which has a rectangular cross-sectional shape, when the simulated force sensation presenting apparatus 1 has arrived at the recess, simulated force sensations $F_x$ and $F_y$ which pull the simulated force sensation presenting apparatus 1 toward the external object 101 are presented ($F_x$ and $F_y$ are both positive). The simulated force sensations $F_x$ and $F_y$ are 0 at the point in time when the simulated force sensation presenting apparatus 1 opposes the recess. Then, once the simulated force sensation presenting apparatus 1 has reached the end of the recess, a simulated force sensation which pushes the simulated force sensation presenting apparatus 1 away from the external object 101 and pushes in the direction opposite from the direction in which the simulated force sensation presenting apparatus 1 is traveling is presented ($F_x$ and $F_y$ are both negative). FIG. 18B to FIG. 18D illustrate examples of a relationship between time (s) and the distance L (m) from the simulated force sensation presenting apparatus 1 to the external object 101, the simulated force sensation $F_x$, and the simulated force sensation $F_y$, respectively, in a case where the simulated force sensation presenting apparatus 1 is moved in the x-axis direction, at a speed of 0.25 m/s, relative to an external object 101 having a recess which has a wedge-shaped cross-sectional shape (a recess in the y-axis direction) as illustrated in FIG. 18A. With the external object 101 having a wedge-shaped cross-sectional shape, positive simulated force sensations $F_x$ and $F_y$ are presented continuously from when the simulated force sensation presenting apparatus 1 reaches the recess to when the simulated force sensation presenting apparatus 1 arrives at a position opposing the deepest part of the recess. Negative simulated force sensations $F_x$ and $F_y$ are then presented continuously until the simulated force sensation presenting apparatus 1 arrives at the end of the recess. However, the component of $F_{yp}$, which depends on the distance L, is included in $F_y$, and thus the simulated force sensation $F_y$ in the y-axis direction changes over time. FIG. 19B to FIG. 19D illustrate examples of a relationship between time (s) and the distance L (m) from the simulated force sensation presenting apparatus 1 to the external object 101, the simulated force sensation $F_x$, and the simulated force sensation $F_y$, respectively, in a case where the simulated force sensation presenting apparatus 1 is moved in the x-axis direction, at a speed of 0.25 m/s, relative to an external object 101 having a recess which has semicircular cross-sectional shape (a recess in the y-axis direction) as illustrated in FIG. 19A. With the external object 101 having a semicircular cross-sectional shape, positive simulated force sensations $F_x$ and $F_y$ are presented continuously from when the simulated force sensation presenting apparatus 1 reaches the recess to when the simulated force sensation presenting apparatus 1 arrives at a position opposing the deepest part of the recess. Negative simulated force sensations $F_x$ and $F_y$ are then presented continuously until the simulated force sensation presenting apparatus 1 arrives at the end of the recess. However, with a semicircular recess, the distance L changes continuously, and thus the magnitudes of the simulated force sensations $F_x$ and $F_y$ change continuously. Furthermore, the component of $F_{yp}$, which depends on the distance L, is included in $F_y$, and thus the simulated force sensation $F_y$ in the y-axis direction changes even more drastically over time. In the examples described above, $F_y$ includes the component of $F_{yp}$, which is dependent on the distance L, and this enables the user 100 to perceive the shape of the external object 101 even more clearly.

[First Variation on First Embodiment]

The configuration may be such that a specific mode can be selected from the plurality of modes A to D described above, and may be such that the simulated force sensation to be presented in each mode can be selected (e.g., from the simulated force sensations expressed by the Equations in the above-described Specific Examples). A type of simulated force sensation selected in this manner will be called a "force sensation type". In this case, instead of the computing unit 13, the simulated force sensation presenting apparatus 1 includes a computing unit 13' having a function for selecting the force sensation type. Selection information p indicating a specific force sensation type selected from a plurality of force sensation types is input to the computing unit 13'. The computing unit 13' sets the force sensation type indicated by the selection information p, and the force sensation presenting mechanism 15 obtains and outputs the control signal CS for presenting the simulated force sensation of the set force sensation type, as described in the first embodiment. In other words, each of the plurality of force sensation types corresponds to physical information including at least one of the physical quantity P1, the function value of the physical quantity P1, the physical quantity P2, the function value of the physical quantity P2, the physical quantity P3, and the function value of the physical quantity P3; the force sensation presenting mechanism 15 carries out asymmetrical movement based on the physical information corresponding to the specific force sensation type which has been selected, and presents a simulated force sensation based on the physical information corresponding to the specific force sensation type. Accordingly, an appropriate simulated force sensation can be presented in accordance with a variety of situations. For example, the simulated force sensation can be switched in accordance with the shape of the external object 101 so that the user 100 can perceive information pertaining to the shape of the external object 101 more clearly.

Alternatively, rather than the selection information p being input to the computing unit 13', the force sensation type may be selected and set within the computing unit 13' in accordance with information that can be obtained within the simulated force sensation presenting apparatus 1 (e.g., time, a direction, a speed, an acceleration, and so on).

Second Embodiment

A second embodiment is a variation on the first embodiment, in which the function of the computing unit 13 is provided outside the simulated force sensation presenting apparatus. In the following, descriptions will be simplified by using the same reference signs for items which have already been described.

<Configuration>

Figure 20:
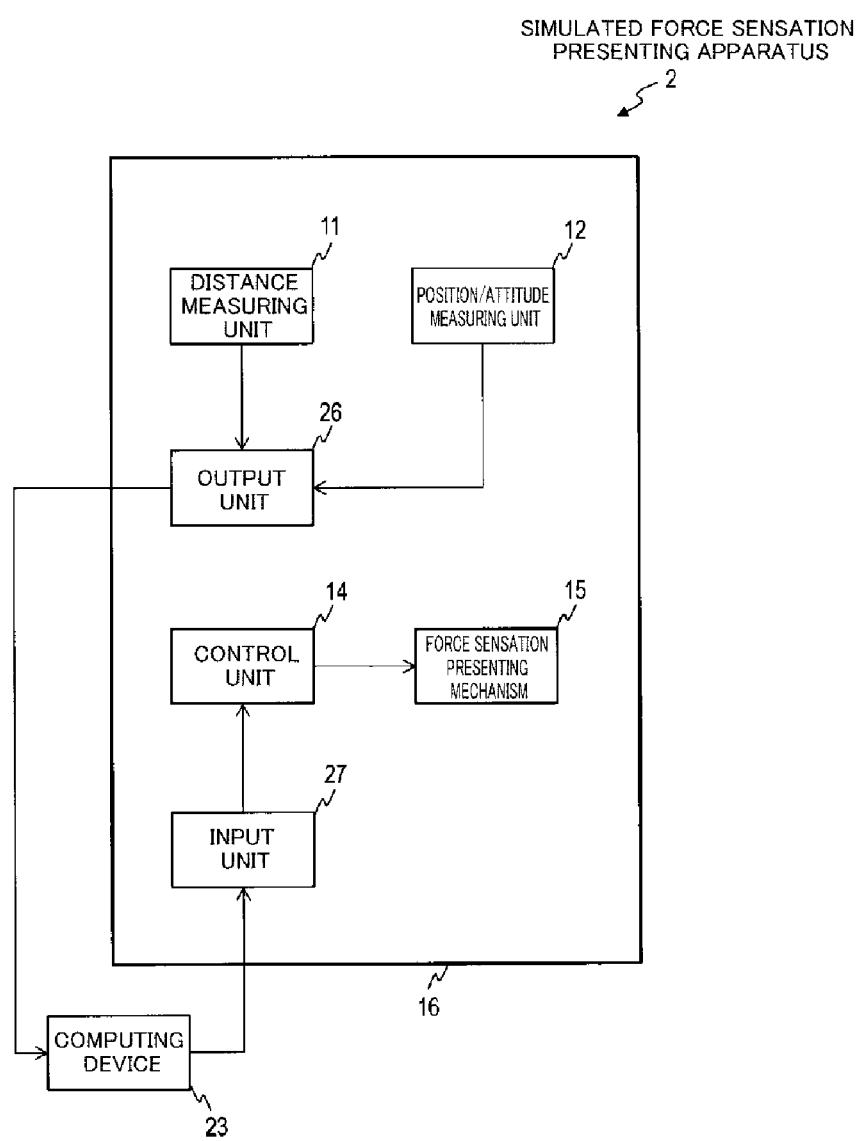
FIG. 20 is a block diagram illustrating an example of a simulated force sensation presenting apparatus according to an embodiment.

As illustrated in FIG. 20, a simulated force sensation presenting apparatus 2 according to the present embodiment includes the distance measuring unit 11, the position/attitude measuring unit 12, the control unit 14, the force sensation presenting mechanism 15, the case 16, an output unit 26, and an input unit 27. A computing device 23 which can communicate with the simulated force sensation presenting apparatus 2 wirelessly or over wires is provided outside the simulated force sensation presenting apparatus 2. The computing device 23 is constituted by a generic or specialized computer executing predetermined programs. This computer may include a single processor and memory, or a plurality of processors and memories. The program may be installed in the computer, or may be recorded in ROM or the like in advance. The processing unit may be partially or completely constituted by electronic circuitry which implements processing functions without using programs, instead of electronic circuitry that implements the functional configuration by having programs loaded, such as a CPU. The electronic circuitry constituting a single apparatus may include a plurality of CPUs.

<Operations>

Operations of the simulated force sensation presenting apparatus 2 according to the second embodiment will be described next. The differences from the first embodiment are as follows. In the first embodiment, the physical quantity P1 obtained by the distance measuring unit 11, and at least one of the physical quantity P2 and the physical quantity P3 obtained by the position/attitude measuring unit 12, were input to the computing unit 13. Instead, in the second embodiment, information expressing the physical quantity P1 and at least one of the physical quantity P2 and the physical quantity P3 (information expressing measured values obtained by the measuring units), is output from the output unit 26 and sent to the computing device 23. Using the information expressing the physical quantity P1 and at least one of the physical quantity P2 and the physical quantity P3, the computing device 23 carries out the processing of the computing unit 13 according to the first embodiment, and obtains and outputs the control signal CS (input information based on the measured values). The control signal CS is input to the input unit 27 of the simulated force sensation presenting apparatus 2 and sent to the control unit 14. The control unit 14 generates the drive signal DS corresponding to this control signal CS, and supplies the drive signal DS to the coil 1524-$i$ of the asymmetrical movement unit 152-$i$. Accordingly, the force sensation presenting mechanism 15 carries out asymmetrical movement based on the control signal CS, and presents a simulated force sensation based on the asymmetrical movement. This makes it possible to reduce the size of the simulated force sensation presenting apparatus 2.

[First Variation on Second Embodiment]

In addition to the function of the computing unit 13, the function of the control unit 14 can also be provided in the computing device 23 outside the simulated force sensation presenting apparatus 2. In this case, the information expressing the physical quantity P1 and at least one of the physical quantity P2 and the physical quantity P3 (the information expressing measured values obtained by the measuring units) is output from the output unit 26 and sent to the computing device 23. Using the information expressing the physical quantity P1 and at least one of the physical quantity P2 and the physical quantity P3, the computing device 23 carries out the processing of the computing unit 13 and the control unit 14 according to the first embodiment, and obtains and outputs the control signal CS and the drive signal DS (input information based on the measured values). The drive signal DS is input to the input unit 27 of the simulated force sensation presenting apparatus 2, and is supplied to the coil 1524-$i$ of the asymmetrical movement unit 152-$i$. Accordingly, the force sensation presenting mechanism 15 carries out asymmetrical movement based on the control signal CS, and presents a simulated force sensation based on the asymmetrical movement. This makes it possible to further reduce the size of the simulated force sensation presenting apparatus 2.

[Second Variation on Second Embodiment]

In the second embodiment or the first variation on the second embodiment, the computing device 23 may have the function of the computing unit 13' described in the first variation on the first embodiment instead of the function of the computing unit 13.

[Other Variations, Etc.]

Note that the present invention is not limited to the foregoing embodiments. For example, a device that presents a simulated force sensation on the basis of other asymmetrical movement may be used as the asymmetrical movement unit 152-$i$, as described in Japanese Patent No. 4551448 (Reference Document 3), WO 2007/086426 (Reference Document 4), Japanese Patent Application Publication No. 2015-226388 (Reference Document 5), or the like. Additionally, the configuration may be such that the force sensation presenting mechanism 15 includes three or more asymmetrical movement units 152-$i$, and a simulated force sensation in a rotational direction can be presented in addition to a simulated force sensation in the translational direction by controlling the driving of those units (see Reference Document 1, for example). Furthermore, the configuration may be such that the asymmetrical movement unit 152-1 configured as disclosed in Reference Document 5 is used, and the translational direction and the rotational direction can be presented using only the one asymmetrical movement unit 152-1. As long as the asymmetrical movement unit 152-$i$ carries out asymmetrical movement in accordance with measurement results from the distance measuring unit 11 and the position/attitude measuring unit 12, and a simulated force sensation having two or more degrees of freedom based on the measurement results can be presented, the configurations and number of the asymmetrical movement units 152-$i$ are not limited.

Additionally, the function value of the physical quantity P1 of L, the function value of the physical quantity P2, and the like may be speeds, or may be accelerations. The function value of the physical quantity P2 may be an angular velocity, or may be an angular acceleration.

The various types of processing described above need not be executed in time series as per the descriptions, and may instead be executed in parallel or individually as necessary or in accordance with the processing capabilities of the device executing the processing. It goes without saying that other changes can be made as appropriate within a scope that does not depart from the essential spirit of the present invention.

When the functions of the computing unit or the computing device described above are implemented by a computer, the processing details of those functions are written in a program. The above-described functions are implemented by the computer as a result of the computer executing the program. The program in which the processing details are written can be recorded into a computer-readable recording medium. A non-transitory recording medium is an example of a computer-readable recording medium. Magnetic recording devices, optical disks, magneto-optical recording media, semiconductor memory, and the like are examples of such a recording medium.

The program is distributed by, for example, selling, transferring, or lending portable recording media such as DVDs and CD-ROMs in which the program is recorded. Furthermore, the configuration may be such that the program is distributed by storing this program in a storage device of a server computer and transferring the program from the server computer to another computer over a network.

A computer executing such a program first stores the program recorded on the portable recording medium or the program transferred from the server computer in its own storage device, for example. When executing the processing, the computer reads the program stored in its own storage device and executes the processing in accordance with the read program. As another way to execute the program, the computer may read the program directly from the portable recording medium and execute the processing in accordance with the program, and furthermore, each time a program is transferred to the computer from the server computer, processing according to the received programs may be executed sequentially. The configuration may be such that the above-described processing is executed by what is known as an ASP (Application Service Provider)-type service that implements the functions of the processing only by instructing execution and obtaining results, without transferring the program from the server computer to the computer in question.

Rather than implementing the processing functions of the apparatus by executing predetermined programs on a computer, at least some of the processing functions may be implemented by hardware.

INDUSTRIAL APPLICABILITY

According to the present invention, for example, a visually-impaired person or a person with a temporary visual impairment can perceive the presence, position, shape, and so on of an external object without touching the external object. In particular, the person can perceive the presence, position, shape, and so on of fragile external objects, external objects which are not to be touched, other people walking or riding in a vehicle, and so on without making contact therewith.

REFERENCE SIGNS LIST 1, 2 Simulated force sensation presenting apparatus

The invention claimed is:

1. A simulated force sensation presenting apparatus that presents a simulated force sensation, the apparatus comprising:
   a force sensation presenter configured to:
      carry out asymmetrical movement based on a first physical quantity or a function value of the first physical quantity, and
      present a simulated force sensation based on the asymmetrical movement, the first physical quantity having been obtained by measuring a distance from an external object to the simulated force sensation presenting apparatus;
   wherein the force sensation presenter carries out the asymmetrical movement based on at least one of:
      a second physical quantity obtained by measuring movement of the simulated force sensation presenting apparatus,
      a function value of the second physical quantity,
      a third physical quantity obtained by measuring an attitude of the simulated force sensation presenting apparatus, and
      a function value of the third physical quantity.

2. The simulated force sensation presenting apparatus according to claim 1, wherein the force sensation presenter carries out the asymmetrical movement based on the first physical quantity and presents the simulated force sensation based on the first physical quantity.

3. The simulated force sensation presenting apparatus according to claim 1, wherein the force sensation presenter carries out the asymmetrical movement based on a temporal change in the first physical quantity and presents a simulated force sensation based on the temporal change in the first physical quantity.

4. The simulated force sensation presenting apparatus according to claim 1, wherein the force sensation presenter:
   carries out the asymmetrical movement based on a combination of:
      at least one of the second physical quantity obtained by measuring movement of the simulated force sensation presenting apparatus, the function value of the second physical quantity, the third physical quantity obtained by measuring an attitude of the simulated force sensation presenting apparatus, and the function value of the third physical quantity, and
      the temporal change in the first physical quantity, and
   presents the simulated force sensation based on the combination of the at least one of the second physical quantity, the function value of the second physical quantity, or the third physical quantity, and the function value of the third physical quantity, and the temporal change in the first physical quantity.

5. The simulated force sensation presenting apparatus according to claim 1, further comprising:
   a computer configured to:
      set a specific force sensation type selected from a plurality of force sensation types, wherein each of the plurality of force sensation types corresponds to physical information including at least one of:
         the first physical quantity,
         the function value of the first physical quantity,
         the second physical quantity obtained by measuring movement of the simulated force sensation presenting apparatus,
         the function value of the second physical quantity,
         the third physical quantity obtained by measuring an attitude of the simulated force sensation presenting apparatus, and
         the function value of the third physical quantity, and
      the force sensation presenter configured to:
         carry out the asymmetrical movement based on the physical information corresponding to the specific force sensation type, and
      present a simulated force sensation corresponding to the specific force sensation type.

6. The simulated force sensation presenting apparatus according to claim 1, further comprising:
   a measurer configured to measure at least one of:
      the first physical quantity,
      the function value of the first physical quantity,
      the second physical quantity expressing movement of the simulated force sensation presenting apparatus,
      the function value of the second physical quantity,
      the third physical quantity expressing an attitude of the simulated force sensation presenting apparatus, and
      the function value of the third physical quantity;
   a provider configured to output information expressing a measured value obtained by the measurer; and
   an accepter configured to accept input information based on the measured value, wherein the force sensation presenter carries out the asymmetrical movement based on the input information.

7. The simulated force sensation presenting apparatus according to claim 1, wherein the force sensation presenter carries out the asymmetrical movement based on the first physical quantity and presents the simulated force sensation based on the first physical quantity.

8. The simulated force sensation presenting apparatus according to claim 1, wherein the force sensation presenter carries out the asymmetrical movement based on a temporal change in the first physical quantity and presents a simulated force sensation based on the temporal change in the first physical quantity.

9. The simulated force sensation presenting apparatus according to claim 2, wherein the force sensation presenter carries out the asymmetrical movement based on a temporal change in the first physical quantity and presents a simulated force sensation based on the temporal change in the first physical quantity.

10. The simulated force sensation presenting apparatus according to claim 1, wherein the force sensation presenter:
carries out the asymmetrical movement based on a combination of:
at least one of the second physical quantity obtained by measuring movement of the simulated force sensation presenting apparatus, the function value of the second physical quantity, the third physical quantity obtained by measuring an attitude of the simulated force sensation presenting apparatus, and the function value of the third physical quantity, and
the temporal change in the first physical quantity, and
presents the simulated force sensation based on the combination of the at least one of the second physical quantity, the function value of the second physical quantity, or the third physical quantity, and the function value of the third physical quantity, and the temporal change in the first physical quantity.

11. The simulated force sensation presenting apparatus according to claim 2, wherein the force sensation presenter:
carries out the asymmetrical movement based on a combination of:
at least one of the second physical quantity obtained by measuring movement of the simulated force sensation presenting apparatus, the function value of the second physical quantity, the third physical quantity obtained by measuring an attitude of the simulated force sensation presenting apparatus, and the function value of the third physical quantity, and
the temporal change in the first physical quantity, and
presents the simulated force sensation based on the combination of the at least one of the second physical quantity, the function value of the second physical quantity, or the third physical quantity, and the function value of the third physical quantity, and the temporal change in the first physical quantity.

12. The simulated force sensation presenting apparatus according to claim 3, wherein the force sensation presenter:
carries out the asymmetrical movement based on a combination of:
at least one of the second physical quantity obtained by measuring movement of the simulated force sensation presenting apparatus, the function value of the second physical quantity, the third physical quantity obtained by measuring an attitude of the simulated force sensation presenting apparatus, and the function value of the third physical quantity, and
the temporal change in the first physical quantity, and
presents the simulated force sensation based on the combination of the at least one of the second physical quantity, the function value of the second physical quantity, or the third physical quantity, and the function value of the third physical quantity, and the temporal change in the first physical quantity.

13. The simulated force sensation presenting apparatus according to claim 1, further comprising:

a computer configured to:
set a specific force sensation type selected from a plurality of force sensation types, wherein each of the plurality of force sensation types corresponds to physical information including at least one of:
the first physical quantity,
the function value of the first physical quantity,
the second physical quantity obtained by measuring movement of the simulated force sensation presenting apparatus,
the function value of the second physical quantity,
the third physical quantity obtained by measuring an attitude of the simulated force sensation presenting apparatus, and
the function value of the third physical quantity, and
the force sensation presenter configured to:
carry out the asymmetrical movement based on the physical information corresponding to the specific force sensation type, and
present a simulated force sensation corresponding to the specific force sensation type.

14. The simulated force sensation presenting apparatus according to claim 2, further comprising:
a computer configured to:
set a specific force sensation type selected from a plurality of force sensation types, wherein each of the plurality of force sensation types corresponds to physical information including at least one of:
the first physical quantity,
the function value of the first physical quantity,
the second physical quantity obtained by measuring movement of the simulated force sensation presenting apparatus,
the function value of the second physical quantity,
the third physical quantity obtained by measuring an attitude of the simulated force sensation presenting apparatus, and
the function value of the third physical quantity, and
the force sensation presenter configured to:
carry out the asymmetrical movement based on the physical information corresponding to the specific force sensation type, and
present a simulated force sensation corresponding to the specific force sensation type.

15. The simulated force sensation presenting apparatus according to claim 1, further comprising:
a measurer configured to measure at least one of:
the first physical quantity,
the function value of the first physical quantity,
the second physical quantity expressing movement of the simulated force sensation presenting apparatus,
the function value of the second physical quantity,
the third physical quantity expressing an attitude of the simulated force sensation presenting apparatus, and
the function value of the third physical quantity;
a provider configured to output information expressing a measured value obtained by the measurer; and
an accepter configured to accept input information based on the measured value, wherein the force sensation presenter carries out the asymmetrical movement based on the input information.

16. A method of presenting simulated force sensation, the method comprising:
generating asymmetrical movement, by a first object, based on a first physical quantity or a function value of the first physical quantity, wherein the first physical quantity is associated with a measured distance between a first object and a second object; and presenting a simulated force sensation based on the asymmetrical movement;

wherein the second object is external to the first object, and wherein the asymmetrical movement is based on at least one of:
- a second physical quantity obtained by measuring movement of the first object,
- a function value of the second physical quantity,
- a third physical quantity obtained by measuring an attitude of the first object, and
- a function value of the third physical quantity.

17. A computer-readable non-transitory recording medium storing computer-executable instructions that when executed by a processor cause a computer system to:

generate asymmetrical movement based on a first physical quantity or a function value of the first physical quantity, wherein the first physical quantity having been obtained by measuring a distance between a simulated force sensation presenter and an object that is external to the simulated force sensation presenter, and present, by the simulated force sensation presenter, a simulated force sensation based on the asymmetrical movement;

wherein the asymmetrical movement is further based on at least one of:
- a second physical quantity obtained by measuring movement of the simulated force sensation presenter,
- a function value of the second physical quantity,
- a third physical quantity obtained by measuring an attitude of the simulated force sensation presenter, and
- a function value of the third physical quantity.

* * * * *